US012427571B2

(12) United States Patent
Nakazawa et al.

(10) Patent No.: US 12,427,571 B2
(45) Date of Patent: Sep. 30, 2025

(54) SOFT MAGNETIC POWDER, MAGNETIC CORE, AND ELECTRONIC COMPONENT

(71) Applicant: TDK CORPORATION, Tokyo (JP)

(72) Inventors: Ryoma Nakazawa, Tokyo (JP); Hiroyuki Ono, Tokyo (JP)

(73) Assignee: TDK CORPORATION, Tokyo (JP)

( * ) Notice: Subject to any disclaimer, the term of this patent is extended or adjusted under 35 U.S.C. 154(b) by 859 days.

(21) Appl. No.: 17/628,815

(22) PCT Filed: Jul. 21, 2020

(86) PCT No.: PCT/JP2020/028323
§ 371 (c)(1),
(2) Date: Jan. 20, 2022

(87) PCT Pub. No.: WO2021/015206
PCT Pub. Date: Jan. 28, 2021

(65) Prior Publication Data
US 2022/0254553 A1 Aug. 11, 2022

(30) Foreign Application Priority Data

Jul. 25, 2019 (JP) ................................ 2019-137298
Jul. 25, 2019 (JP) ................................ 2019-137300
(Continued)

(51) Int. Cl.
*B22F 1/16* (2022.01)
*H01F 1/24* (2006.01)
*H01F 27/255* (2006.01)

(52) U.S. Cl.
CPC .................. *B22F 1/16* (2022.01); *H01F 1/24* (2013.01); *H01F 27/255* (2013.01); *B22F 2301/35* (2013.01)

(58) Field of Classification Search
CPC .... B22F 1/16; B22F 2301/35; B22F 2999/00; B22F 1/00; B22F 3/00; H01F 1/24;
(Continued)

(56) References Cited

U.S. PATENT DOCUMENTS

2007/0235109 A1* 10/2007 Maeda ..................... B22F 1/16
148/307
2009/0242825 A1 10/2009 Ohwaki et al.
(Continued)

FOREIGN PATENT DOCUMENTS

JP 2003-142310 A 5/2003
JP 2006-128663 A 5/2006
(Continued)

OTHER PUBLICATIONS

Jan. 25, 2022 International Preliminary Report on Patentability issued in International Patent Application No. PCT/JP2020/028323.

*Primary Examiner* — Andrew J. Oyer
(74) *Attorney, Agent, or Firm* — Oliff PLC

(57) ABSTRACT

A soft magnetic powder capable of maintaining high insulation resistance even after exposure to a high-temperature environment, a dust core, and an electronic component is provided with the dust core. A soft magnetic powder including soft magnetic metal particles, the surfaces of which are covered by an inorganic insulating coating, the inorganic insulating coating having a first coating part in contact with the surfaces of the soft magnetic metal particles, and a second coating part formed on the outside of the first coating part, the first coating part including phosphorus and oxygen, and the second coating part including silicon and oxygen.

18 Claims, 7 Drawing Sheets

(30) Foreign Application Priority Data

Jul. 25, 2019 (JP) ................................ 2019-137301
Jul. 20, 2020 (JP) ................................ 2020-123820

(58) Field of Classification Search
CPC . H01F 27/255; H01F 1/26; H01F 1/33; H01F 2017/048; C22C 2202/02; C22C 38/00; C22C 45/02
See application file for complete search history.

(56) References Cited

U.S. PATENT DOCUMENTS

| | | | | |
|---|---|---|---|---|
| 2010/0051851 | A1* | 3/2010 | Mitani | B22F 1/06 427/127 |
| 2010/0255188 | A1 | 10/2010 | Maeda et al. | |
| 2011/0156850 | A1 | 6/2011 | Okamoto et al. | |
| 2018/0200787 | A1* | 7/2018 | Saito | B22F 1/12 |

FOREIGN PATENT DOCUMENTS

| | | | |
|---|---|---|---|
| JP | 2008-063651 | A | 3/2008 |
| JP | 2009-120915 | A | 6/2009 |
| JP | 2009-228107 | A | 10/2009 |
| JP | 2009-231481 | A | 10/2009 |
| JP | 2009-266973 | A | 11/2009 |
| WO | 2010/026984 | A1 | 3/2010 |
| WO | 2017/018264 | A1 | 2/2017 |

* cited by examiner

SOFT MAGNETIC POWDER, MAGNETIC CORE, AND ELECTRONIC COMPONENT

TECHNICAL FIELD

The present disclosure relates to a soft magnetic powder, a core, and an electronic component.

BACKGROUND

In an electronic component (e.g., a transformer, a choke coil, and an inductor), a coil, which is an electrical conductor, is disposed around or inside a core that exhibits predetermined magnetic properties.

Examples of magnetic materials used for the core include soft magnetic metal materials (e.g., a Fe-based alloy). The core can be obtained as a dust core, for example, by compression molding a resin and a soft magnetic powder including soft magnetic metal particles. It can be expected that increasing the proportion (the packing rate) of the magnetic component in the dust core will improve the magnetic properties. However, because the electrical resistance of the soft magnetic metal is smaller than that of a ferrite magnetic material, increasing the proportion of the magnetic component in the dust core might cause the soft magnetic metal particles to touch each other, possibly reducing specific resistance.

Under such circumstances, a technology to form an insulating film on the surface of the soft magnetic metal particles has been proposed. For example, Patent Literature 1 discloses an example in which an insulating film made of a phosphate compound is formed on a surface of a metal particle including Fe. Patent Literature 2 discloses an example in which a silica film, instead of the film made of the phosphate compound, is formed on the surface of the metal particle including Fe.

However, the technologies described in Patent Literatures 1 and 2 may cause a drastic reduction in the insulation resistance of the soft magnetic powder when the powder is exposed to a high temperature environment. The dust cores comprising the soft magnetic powders described in Patent Literatures 1 and 2 unfortunately have low heat resistance under the high temperature environment.

Patent Literature 1: JP Patent Application Laid Open No. 2009-120915

Patent Literature 2: JP Patent Application Laid Open No. 2009-231481

SUMMARY

The present disclosure has been made under such circumstances. It is an object of the present disclosure to provide a soft magnetic powder and a core that can maintain high insulation resistance even after they are exposed to a high temperature environment, and an electronic component comprising the core.

To achieve the above object, a soft magnetic powder according to the present disclosure includes a soft magnetic metal particle whose surface is coated with an inorganic insulating film, wherein the inorganic insulating film includes a first coating part in contact with the surface of the soft magnetic metal particle, and a second coating part formed at an outer side of the first coating part, and wherein the first coating part includes phosphorus and oxygen, and the second coating part includes silicon and oxygen.

Through diligent consideration, the present inventors have found that forming the multilayer inorganic insulating film including the first coating part containing P and the second coating part containing Si on the surface of the soft magnetic metal particle improves the insulating properties of the soft magnetic powder under a high temperature environment. In other words, the soft magnetic powder according to the present disclosure can prevent the reduction of its insulation resistance and maintain high insulating properties even when exposed to the high temperature environment for a long time.

The sum of the thickness ($T_1$) of the first coating part and the thickness ($T_2$) of the second coating part preferably satisfies 10 nm$\leq T_1+T_2 \leq$150 nm, and the ratio of the thickness ($T_2$) of the second coating part to the sum ($T_1+T_2$) of the thickness of the first coating part and the thickness of the second coating part preferably satisfies $20\% \leq T_2/(T_1+T_2) \leq 90\%$, and more preferably satisfies $50\% \leq T_2/(T_1+T_2) \leq 80\%$.

Controlling the thickness of the first coating part and the thickness of the second coating part under the predetermined conditions as above allows for high insulating properties and high permeability at the same time. In other words, the reduction in the insulation resistance of the soft magnetic powder can be further prevented, and high permeability can be achieved, after the soft magnetic powder is exposed to the high temperature environment for a long time.

An intermediate layer including phosphorus and silicon is preferably formed between the first coating part and the second coating part in the inorganic insulating film. Forming the intermediate layer including phosphorus and silicon increases the bonding between the first coating part and the second coating part and further improves the insulating properties under the high temperature environment.

The total thickness (S1) of the inorganic insulating film is preferably 200 nm or less, and the ratio of the thickness (M1) of the intermediate layer to the total thickness (S1) of the inorganic insulating film is preferably $0.05<M1/S1\leq 0.2$. Controlling the total thickness of the inorganic insulating film and the thickness (M1) of the intermediate layer within the predetermined range allows for high insulating properties and high permeability at the same time. In other words, the reduction in the insulation resistance of the soft magnetic powder can be further prevented, and high permeability can be achieved, after the soft magnetic powder is exposed to the high temperature environment for a long time.

The first coating part preferably includes at least one element ($\alpha$) selected from the group consisting of alkali metals (Li, Na, K, Rb, Cs) and alkaline earth metals (Mg, Ca, Sr, Ba). The at least one element $\alpha$ included in the first coating part is more preferably Na. The content ratio ($\alpha$/P) by mole of the at least one element $\alpha$ to phosphorus (P) in the first coating part is preferably $0.05\leq\alpha/P\leq 0.5$, and is more preferably $0.1\leq\alpha/P\leq 0.3$.

The first coating part preferably includes at least one element ($\beta$) selected from the group consisting of Zn and Al. The at least one element included in the first coating part is more preferably Zn. The content ratio ($\beta$/P) by mole of the at least one element $\beta$ to phosphorus (P) in the first coating part is preferably $0.5\leq\beta/P\leq 0.8$, and is more preferably $0.5\leq\beta/P\leq 0.7$.

Including the at least one element $\alpha$ or the at least one element $\beta$ at the predetermined ratio in the first coating part as above further prevents the reduction of the insulation resistance after a heat resistance test and further improves the insulating properties of the soft magnetic powder under the high temperature environment.

Using the soft magnetic powder according to the present disclosure as the magnetic material for the core can improve the heat resistance of the core under the high temperature environment. The core including the soft magnetic powder according to the present disclosure can be used in an electronic component (e.g., a transformer, a choke coil, an inductor, and a reactor coil) and is particularly suitable for the inductor.

BRIEF DESCRIPTION OF THE DRAWING(S)

DETAILED DESCRIPTION

The present disclosure will be described below based on embodiments shown in figures. However, the present invention is not limited to the following embodiments.

First Embodiment

Figure 1:
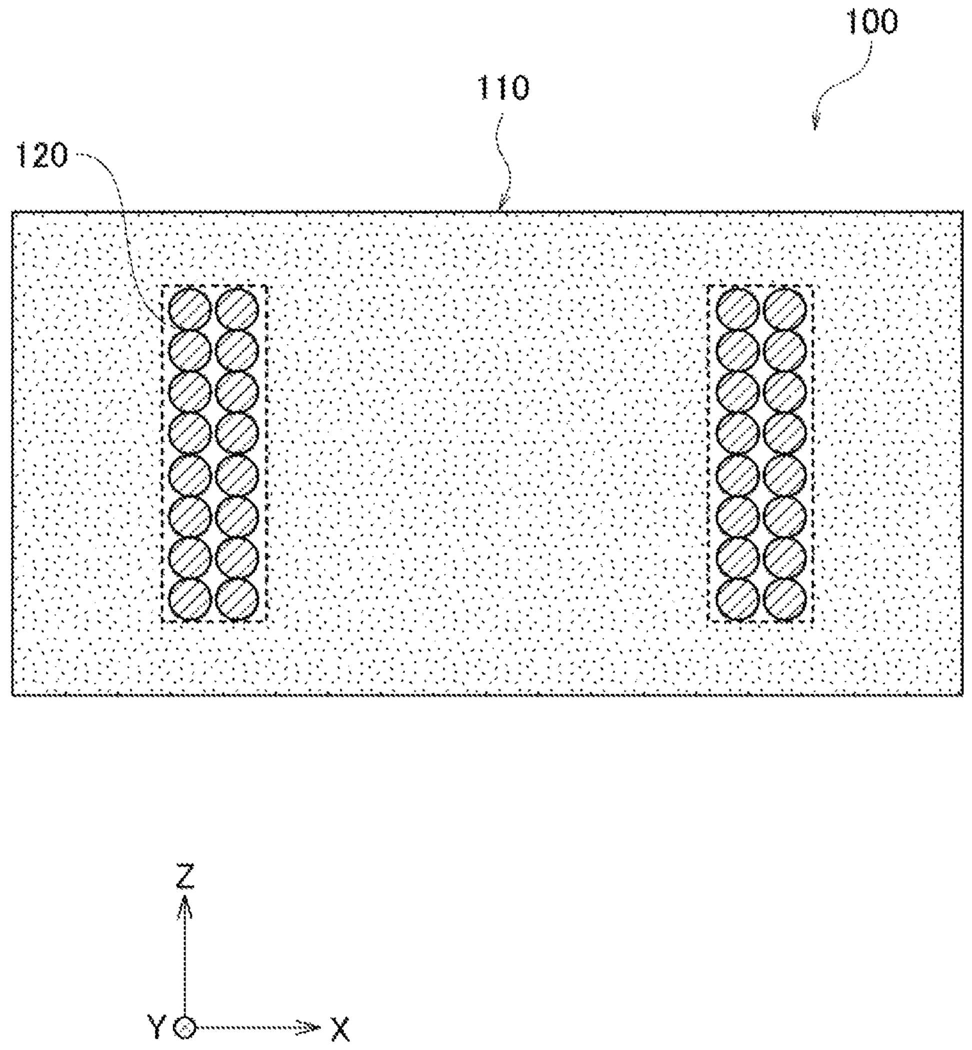
FIG. 1 is a schematic cross-sectional view of an inductor element according to an embodiment of the present disclosure.

As shown in FIG. 1, an inductor element 100 according to an embodiment of the present disclosure includes a dust core 110 and a coil 120 embedded inside the dust core 110.

Figure 2:
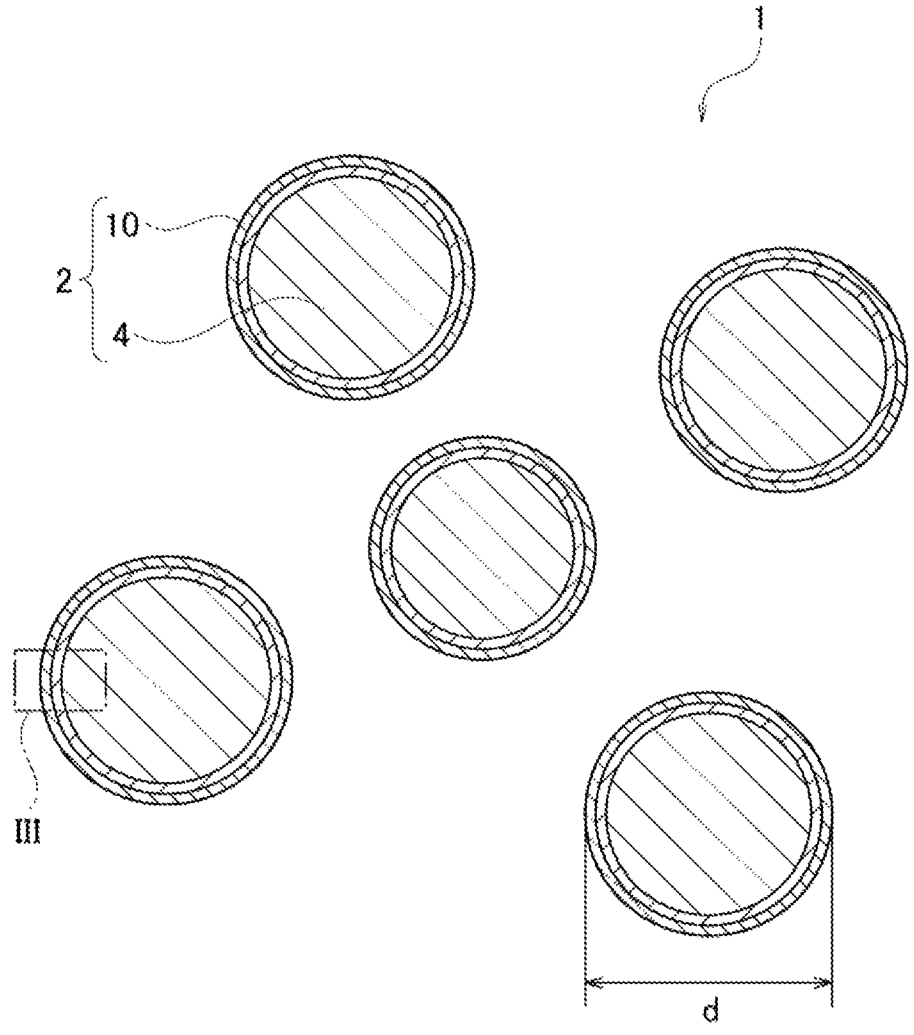
FIG. 2 is a schematic view showing a cross-section of a soft magnetic powder according to an embodiment of the present disclosure.

The shape of the dust core 110 shown in FIG. 1 may be freely determined and is not limited. Examples of the shape include a cylinder, an elliptic cylinder, and a prism. The dust core 110 includes a soft magnetic powder 1 and a resin used as a binder. As shown in FIG. 2, soft magnetic metal particles 4 constitute the soft magnetic powder 1. The binder combines the soft magnetic metal particles 4 with each other. The dust core 110 having the predetermined shape is thus formed. Characteristics of the soft magnetic powder 1 according to the present embodiment are explained below.

Soft Magnetic Powder

As shown in FIG. 2, the soft magnetic powder 1 according to the present embodiment includes coated particles 2, which are the soft magnetic metal particles 4 on whose surface an inorganic insulating film 10 is formed. In the soft magnetic powder 1, particles other than the coated particles 2 may coexist with the coated particles 2. The proportion of the coated particles 2 is preferably at least 5 mass % in 100 mass % of all particles contained in the soft magnetic powder 1. The shape of the soft magnetic metal particle 4 is not limited, but is normally a sphere.

The particle size distribution of the soft magnetic powder 1 is preferably within a range of 200 μm or smaller in the present embodiment. The particle size distribution of the coated particles 2, excluding uncoated particles, may also be within the above-mentioned range, but is particularly preferably within a range of 0.1-10 μm. Although a method of measuring the particle diameter "d" is not limited in the present embodiment, a laser diffraction and scattering method is preferably applied when measuring powdery samples, whereas an image analysis using SEM or the like is preferably applied when measuring the soft magnetic powder 1 included in the dust core 110 and a magnetic component.

When the particle diameters are measured using the image analysis, the area of each metal particle in an observation region of 400 μm squared is calculated, specifically. Using the area value, the circle equivalent diameter of each metal particle is calculated. The above measurement is preferably performed for at least 30 regions to find the particle size distribution of the soft magnetic powder 1.

The material of each soft magnetic metal particle 4 is not limited in the present embodiment as long as the material exhibits soft magnetism. Materials that exhibit soft magnetism include, for example, pure iron, Fe—Si-based alloys (iron-silicon), Fe—Al-based alloys (iron-aluminum), permalloy-based alloys (Fe—Ni), sendust-based alloys (Fe—Si—Al), Fe—Si—Cr-based alloys (iron-silicon-chromium), Fe—Si—Al—Ni-based alloys, Fe—Ni—Si—Co-based alloys, Fe-based amorphous alloys, Fe-based nanocrystalline alloys, and the like.

The coated particles 2 of the soft magnetic powder 1 may be composed of all the same material, or may be composed of a mixture of several particle groups with different materials.

For example, some of the soft magnetic metal particles 4 in the soft magnetic powder 1 may comprise pure iron particles while some others may comprise a Fe—Si-based alloy. Cases where the materials differ include a case where the elements constituting the metals or alloys of the soft magnetic metal particles 4 are different, a case where the constituent elements are the same but the compositions are different, and a case where the crystal systems of the soft magnetic metal particles 4 are different. When the soft magnetic powder 1 includes the uncoated particles as well as the coated particles 2, the materials of the coated particles 2 and the uncoated particles may be the same or different.

Inorganic Insulating Film

The inorganic insulating film 10 coating the surface of each soft magnetic metal particle 4 is described next. The inorganic insulating film 10 covers at least a part of the surface of the soft magnetic metal particle 4, and may cover the entire surface of the soft magnetic metal particle 4. The percentage of the inorganic insulating film 10 covering the surface of the soft magnetic metal particle 4 (the coverage percentage) is preferably 60% or more, and is more preferably 80% or more. The inorganic insulating film 10 may cover the surface of the soft magnetic metal particle 4 continuously or intermittently.

Figure 3:
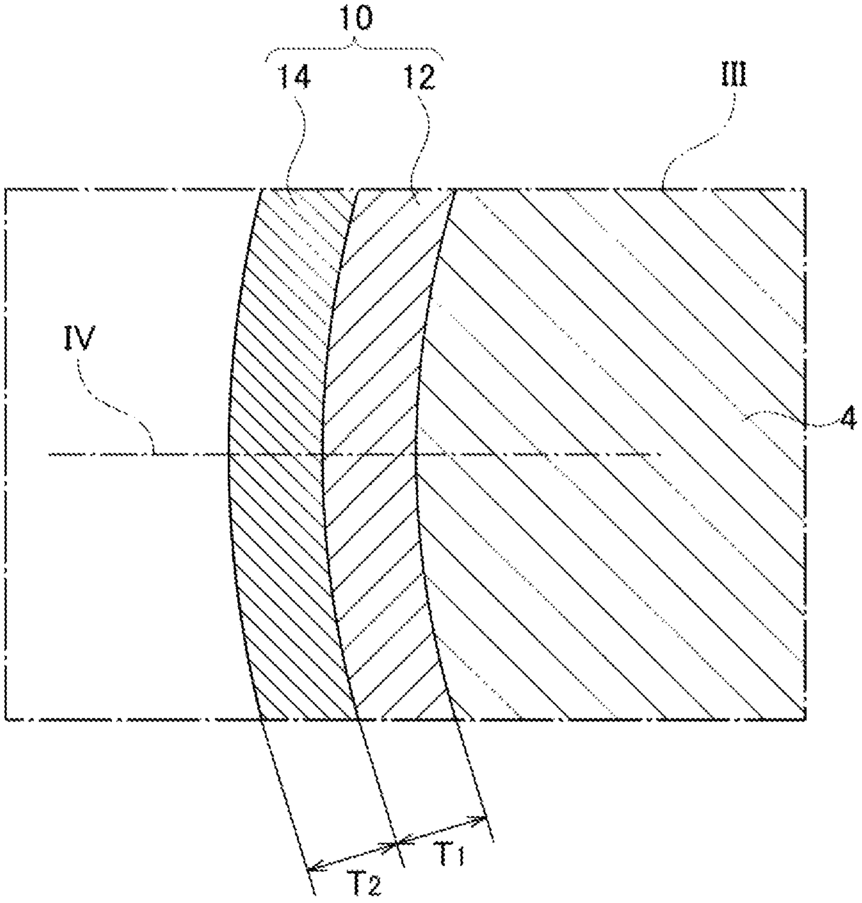
FIG. 3 is a schematic view showing an enlarged cross-section of a region III in FIG. 2.

FIG. 3 is a schematic view showing an enlarged cross-section of a region III in FIG. 2. As shown in FIG. 3, the inorganic insulating film 10 includes a first coating part 12 and a second coating part 14, and is separated into at least two layers. The first coating part 12 is in contact with the outermost surface of the soft magnetic metal particle 4 and covers the surface. The second coating part 14 is formed on the outer side of the first coating part 12 seen from the perspective of the soft magnetic metal particle 4.

Figure 4:
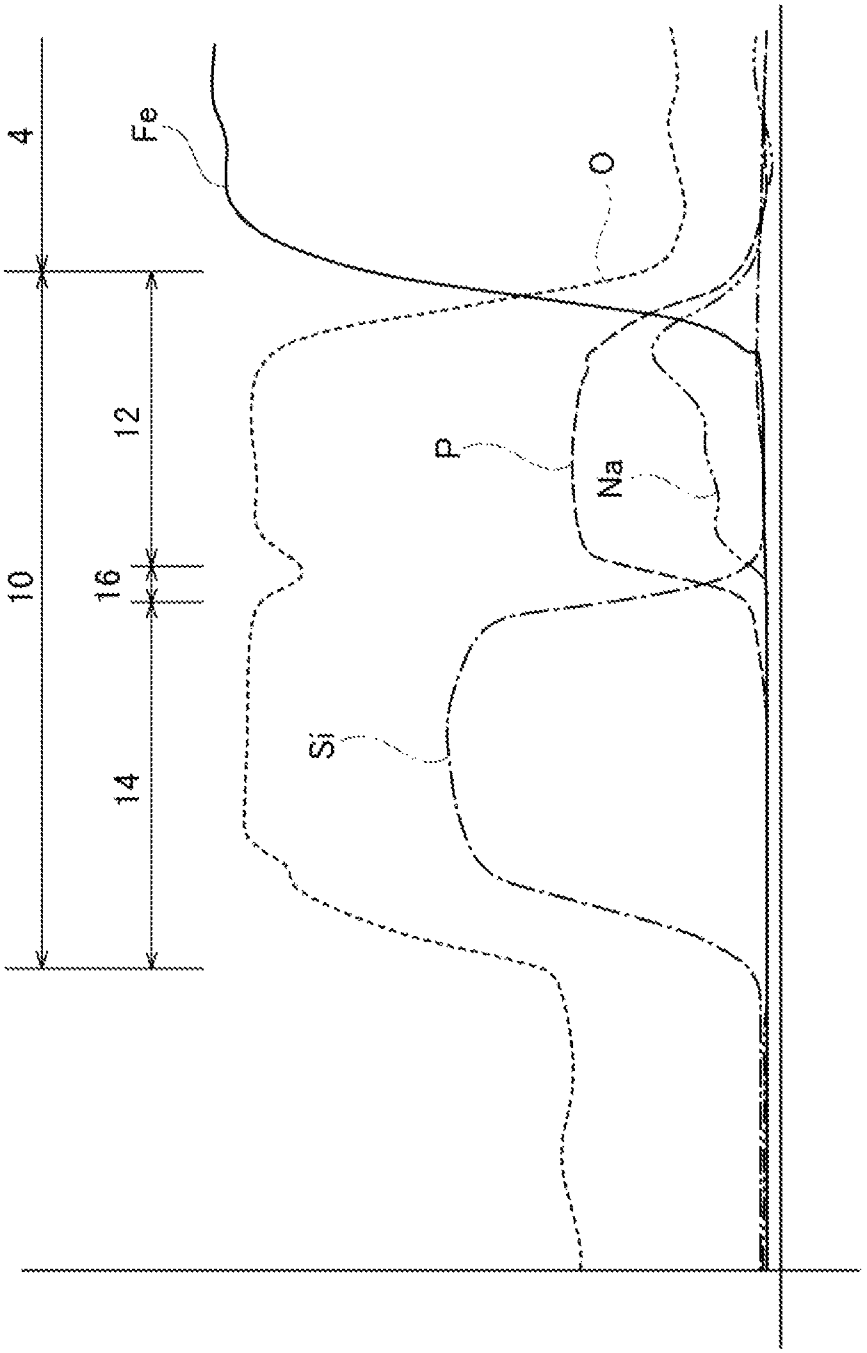
FIG. 4 is a schematic view showing a result of film analysis using TEM-EDS along a measurement line IV in FIG. 3.

FIG. 4 schematically shows a result of film analysis through energy dispersive X-ray spectroscopy (EDS) using a transmission electron microscope (TEM) along a measurement line IV in FIG. 3.

The horizontal axis of FIG. 4 corresponds to the longitudinal direction of the measurement line IV, whereas the vertical axis of FIG. 4 shows the content rate (atom %) of each detected element. That is, the right part of FIG. 4 shows the component ratio in the vicinity of the surface of the soft magnetic metal particle 4, the central part of FIG. 4 shows the component ratio of the inorganic insulating film 10, and the left part of FIG. 4 shows the component ratio of the resin used to fix the sample in TEM observation. FIG. 4 shows only the behavior of the content of main elements (elements necessary for interpreting the present disclosure), having information of an unnecessary element (e.g., carbon (C)) being deleted from the raw data obtained through the film analysis using TEM-EDS.

The main component of the first coating part 12, which is in contact with the outermost surface of the soft magnetic metal particle 4, includes phosphorus (P) and oxygen (O), as shown in FIG. 4. That is, the first coating part 12 is a phosphate compound film. More specifically, the first coating part 12 is an area in the inorganic insulating film 10 where the content rate of phosphorus (P) is at least 5 atom % and is 5 times greater than that of Si. Note that, the content rate of P mentioned above is expressed as the ratio of P to the total content of the main elements, which are O, Si, and P, detected at each measurement point of the inorganic insulating film 10.

The first coating part 12 shown in FIG. 4 includes Na, as an example, as well as phosphorus and oxygen. In the present embodiment, the first coating part 12 thus preferably includes at least one element selected from the group consisting of alkali metals (Li, Na, K, Rb, Cs), alkaline earth metals (Mg, Ca, Sr, Ba), Zn, and Al, and more preferably includes Na or Zn. In the present embodiment, at least one element selected from the group consisting of the alkali metals (Li, Na, K, Rb, Cs) and the alkaline earth metals (Mg, Ca, Sr, Ba) is defined as an addition element α, and at least one element selected from the group consisting of Zn and Al is defined as an addition element β.

When the addition element α is included in the first coating part 12, the content ratio (α/P) by mole of the addition element α to phosphorus (P) is preferably $0.05 \le \alpha/P \le 0.5$, and is more preferably $0.1 \le \alpha/P \le 0.3$, in 100 mol % of the total amount of the elements included in the first coating part 12.

On the other hand, when the addition element β is included in the first coating part 12, the content ratio (β/P) by mole of the addition element β to phosphorus (P) is preferably $0.5 \le \beta/P \le 0.8$, and is more preferably $0.5 \le \beta/P \le 0.7$, in 100 mol % of the total amount of the elements included in the first coating part 12.

The content of Na as the addition element α tends to be higher on the side closer to the soft magnetic metal particle 4 than the second coating part 14 as shown in FIG. 4. When another element (Li, K, Rb, Cs, Mg, Ca, Sr, Ba) is included as the addition element α or when Zn or Al is included as the addition element β, the behavior of the content of the addition element α or β is the same as that of Na.

The main component of the second coating part 14 includes silicon (Si) and oxygen as shown in FIG. 4, which means that the second coating part 14 is a silicon oxide film. More specifically, the second coating part 14 is an area in the inorganic insulating film 10 where the content rate of silicon (Si) is at least 10 atom % and is 5 times greater than that of phosphorus (P). Note that, the content rate of Si mentioned above is expressed as the ratio of Si to the total content of the main elements, which are O, Si, and P, detected at each measurement point of the inorganic insulating film 10.

Although not shown in FIG. 3, an intermediate layer 16 may be present in between the first coating part 12 and the second coating part 14. The intermediate layer 16 may be, for example, a diffusion layer including both phosphorus and silicon. In the present embodiment, the intermediate layer 16 is an area in the inorganic insulating film 10 that comprises at least 5 atom % of phosphorus (P) and at least 5 atom % of silicon (Si) while the content rate of P is 0.7-1.5 times that of Si.

The intermediate layer 16 is thin, having a thickness of 0.4 nm or less, in the present embodiment as shown in FIG. 4. When the layer between the first coating part 12 and the second coating part 14 has a thickness of 0.4 nm or less, the intermediate layer 16 is deemed to be not present, as shown in FIG. 3. When the intermediate layer 16 is present, the thickness of the intermediate layer 16 is not included in the thickness ($T_1$) of the first coating part 12 or the thickness ($T_2$) of the second coating part 14 described later. A second embodiment including the intermediate layer 16 will be described later.

Despite the above description of the composition of the inorganic insulating film 10, the first coating part 12 and the second coating part 14 may further include one or more other elements (γ) in addition to the above-mentioned elements. The first coating part 12 may further include one or more other elements (γ) selected from iron (Fe), boron (B), and the like. The second coating part 14 may further include one or more other elements (γ) selected from iron, boron, magnesium (Mg), and the like. In terms of the atomic percent, the content ratio of γ (one or more other elements) to phosphorus is preferably 0.01 or less ($\gamma/P \le 0.01$), or, the content ratio of γ to silicon is preferably 0.1 or less ($\gamma/Si \le 0.1$).

The thickness ($T_1$) of the first coating part 12 and the thickness ($T_2$) of the second coating part 14 shown in FIG. 3 are preferably set in predetermined ranges. Specifically, the sum ($T_1+T_2$) of the thickness of the first coating part 12 and the thickness of the second coating part 14 preferably satisfies $10\ nm \le T_1+T_2 \le 150\ nm$, and more preferably satisfies $30\ nm \le T_1+T_2 \le 80\ nm$.

The ratio of the thickness ($T_2$) of the second coating part 14 to the sum ($T_1+T_2$) of the thickness of the first coating part 12 and the thickness of the second coating part 14 preferably satisfies $20\% \le T_2/(T_1+T_2) \le 90\%$, and more preferably satisfies $50\% \le T_2/(T_1+T_2) \le 80\%$.

The thickness of the first coating part 12 and the thickness of the second coating part 14 can be measured in the above-mentioned film analysis using TEM-EDS. For the measurement of the thicknesses, 10 regions to be analyzed are randomly extracted from the vicinity of the surface of the particle, and then the thickness of each layer is measured in each region. An average value of the obtained data is calculated and defined as the thickness ($T_1$, $T_2$) of each layer.

The components included in the inorganic insulating film 10 can be analyzed using TEM-EDS in the present embodiment as described above. To analyze the soft magnetic powder 1 included in the dust core 110, a sample for TEM observation is prepared through a micro sampling method using a focused ion beam (FIB) and then the same film analysis as described above is performed.

A method of manufacturing the soft magnetic powder 1, the dust core 110, and the inductor element 100 according to the present embodiment is described next. The manufacturing method is not limited to the following.

Method of Manufacturing the Soft Magnetic Powder

The soft magnetic metal particles 4 that constitute the soft magnetic powder 1 are prepared first. The soft magnetic metal particles 4 can be manufactured using a known powder manufacturing method, such as a gas atomization method, a water atomization method, a rotating disk method, a carbonyl method, and the like. Obtaining ribbons using a single-roll method and then mechanically pulverizing the ribbons can also manufacture the soft magnetic metal particles 4. Among these methods, the carbonyl method is preferably used, allowing the soft magnetic metal particles 4 to have desired magnetic properties the most. The particle size distribution of the soft magnetic metal particles 4 can be adjusted through sieve classification, airflow classification, and other classifications.

Next, the inorganic insulating film 10 comprising the first coating part 12 and the second coating part 14 is formed on the surface of each soft magnetic metal particle 4. The coated particles 2 are thus obtained. The first coating part 12 including phosphorus and oxygen can be formed through a phosphate treatment. Specifically, phosphoric acid or phosphate including a predetermined element ($\alpha$, $\beta$) is dissolved in a solvent (e.g., water, alcohol) to prepare a phosphate solution first. Then, the soft magnetic metal particles 4 are soaked in the solution, or are sprayed with the solution. By drying the soft magnetic metal particles 4 after soaking or spraying, the first coating part 12 is formed on the surface of each soft magnetic metal particle 4. The thickness of the first coating part 12 can be controlled in accordance with the concentration of the precursor (phosphoric acid or phosphate) included in the phosphate solution, the amount of time during which the soft magnetic metal particles 4 are soaked in the solution, the amount of the solution sprayed on the particles, and the like.

After the first coating part 12 is formed, the second coating part 14 including silicon and oxygen is formed on the surface of the first coating part 12. Specifically, a solution including a silane coupling agent as a silicon source is sprayed on the soft magnetic metal particles 4, or the soft magnetic metal particles 4 are soaked in the solution. Thereafter, the second coating part 14 is formed by drying or/and heat-treating the soft magnetic metal particles 4.

Examples of the silane coupling agent used here include Tetramethoxysilane (TMOS), Tetraethoxysilane (TEOS), Hexyl(trimethylsilyl)ether, and the like. TEOS is preferably used. A solvent that solves the silane coupling agent is not limited. Examples of the solvent include water, ethanol, acetone, isopropyl alcohol, and the like. The thickness of the second coating part 14 can be controlled in accordance with the concentration of the silane coupling agent included in the solution, the amount of the solution sprayed on the soft magnetic metal particles 4, the amount of time during which the particles are soaked in the solution, and the like.

When the soft magnetic powder 1 includes the particles other than the coated particles 2, the coated particles 2 may be prepared according to the above-mentioned process and then mixed with the other particles to form the soft magnetic powder 1. To form either a phosphate compound film or a silicon-based oxide film on the surface of the particles other than the coated particles 2, the other particles may be subjected to the phosphate treatment or the sol-gel coating together with the coated particles 2.

Method of Manufacturing the Dust Core and the Inductor Element

The dust core is manufactured next using the above soft magnetic powder 1. A method of manufacturing the dust core is not limited, and a known method may be used. For example, the dust core 110 shown in FIG. 1 can be prepared using the method described below.

Granules (raw material) of the dust core 110 are prepared first. The granules can be obtained by kneading a binder diluted with a solvent and the soft magnetic powder 1 including the coated particles 2 having the inorganic insulating film 10, and then drying the mixed material. The granules may be granulated using a sieve with an opening of 100-400 μm.

The solvent for diluting the binder when the granules are prepared can be a ketone (e.g., acetone) or ethanol, for example. The binder is not limited to a particular type. Examples of the binder include epoxy resin, phenol resin, melamine resin, urea resin, furan resin, alkyd resin, unsaturated polyester resin, diallyl phthalate resin, polyamide, polyphenylenesulfide (PPS), polypropylene (PP), liquid crystal polymer (LCP), waterglass (sodium silicate), silicone resin, and the like. When a resin is used as the binder, the resin may be a thermosetting resin or a thermoplastic resin as described above, but is preferably a thermosetting resin.

The amount of the binder is also not limited, but is preferably 2-5 parts by mass with respect to 100 parts by mass of the soft magnetic powder 1, for example. Kneading the binder at this ratio enables the packing rate of the soft magnetic powder 1 in the dust core to be about 70-90 vol %.

The above granules, together with a coil as an insert member, are used to fill a mold and are then compression molded. This forms a molded body having a shape of the dust core to be prepared. Appropriately heating the molded body forms the dust core 110. The conditions of the heat treatment may be determined appropriately based on the type of the binder used. Having the coil 120 embedded inside, the dust core 110 thus obtained functions as the inductor element 100, which is used by applying a voltage to the coil 120.

Summary of the First Embodiment

In the present embodiment, covering the surface of the soft magnetic metal particles 4 included in the soft magnetic powder 1 with the multilayer inorganic insulating film 10 including the first coating part 12 containing the phosphate compound and the second coating part 14 containing the silicon-based oxide improves the heat resistance of the soft magnetic powder 1. In the present embodiment, improving the heat resistance means preventing the reduction in the insulation resistance of the soft magnetic powder 1 and maintaining high insulating properties even after the soft magnetic powder 1 is exposed to a high temperature environment (150° C. or higher) for a long time (2000 hours or more).

Controlling the thickness of the first coating part 12 and the thickness of the second coating part 14 within the range of the predetermined ratio further improves the heat resistance of the soft magnetic powder 1. Specifically, the ratio of the thickness ($T_2$) of the second coating part 14 to the sum ($T_1+T_2$) of the thickness of the first coating part 12 and the thickness of the second coating part 14 preferably satisfies $20\% \leq T_2/(T_1+T_2) \leq 90\%$, and more preferably satisfies $50\% \leq T_2/(T_1+T_2) \leq 80\%$, as described above.

Controlling the sum ($T_1+T_2$) of the thickness of the first coating part 12 and the thickness of the second coating part 14 within the predetermined range improves the magnetic properties. Specifically, the sum preferably satisfies 10 nm≤$T_1$+$T_2$≤150 nm, and more preferably satisfies 30 nm≤$T_1$+$T_2$≤80 nm, as described above.

A thicker (e.g., 200 nm or more) insulating film covering a particle surface normally tends to increase electrical resistance of a soft magnetic powder and improve its heat resistance, whereas the thicker insulating film tends to negatively affect magnetic properties of a dust core and especially reduce permeability. On the other hand, in the case of the dust core 110 including the soft magnetic powder 1 according to the present embodiment, controlling the thickness of the first coating part 12 and the thickness of the second coating part 14 within the range of the predetermined ratio enables the dust core 110 to maintain high insulation resistance after a heat resistance test and to have high permeability at the same time, despite the thin inorganic insulating film 10.

The first coating part 12 preferably includes the predetermined amount of the addition element α (alkali metal or alkaline earth metal) or the addition element β (Zn, Al) in the present embodiment. Including at least one of the above addition elements further improves the heat resistance of the soft magnetic powder 1.

A reason why the addition element α or β further improves the heat resistance is not necessarily clarified, but may be as follows, for example. The content of the addition element α or β in the first coating part 12 is higher on the side closer to the surface of the soft magnetic metal particle 4, as shown in FIG. 4. From this fact, it is assumed that the above addition elements have an action of preventing Fe on the outermost surface of the soft magnetic metal particle 4 from diffusing into the inorganic insulating film 10 and from combining with oxygen under the high temperature atmosphere. Consequently, when the addition element α or β is included in the first coating part 12, excessive formation of iron oxide at the interface between the soft magnetic metal particle 4 and the inorganic insulating film 10 is prevented, and thus the reduction of the insulation resistance can be prevented.

Using the soft magnetic powder 1 according to the present embodiment as the magnetic material of the dust core 110 can improve the heat resistance of the dust core 110 under the high temperature environment.

Second Embodiment

Figure 5:
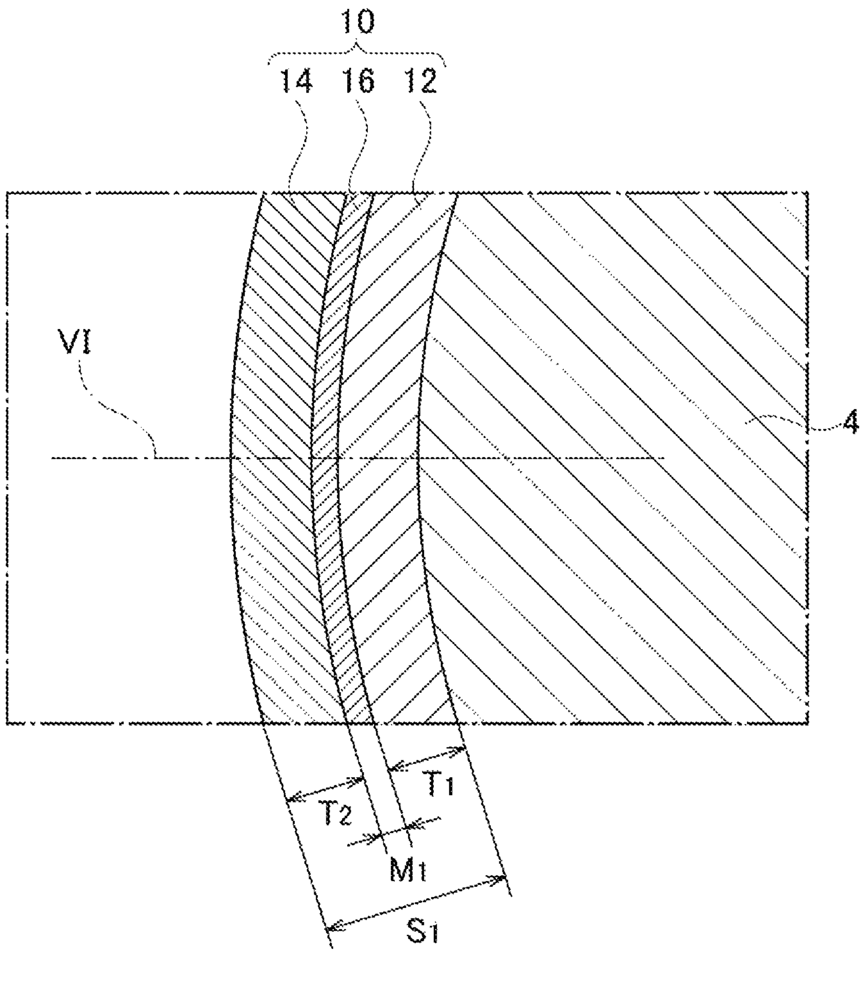
FIG. 5 is a schematic view showing an enlarged cross-section of a main part of a soft magnetic powder according to a second embodiment.
Figure 6:
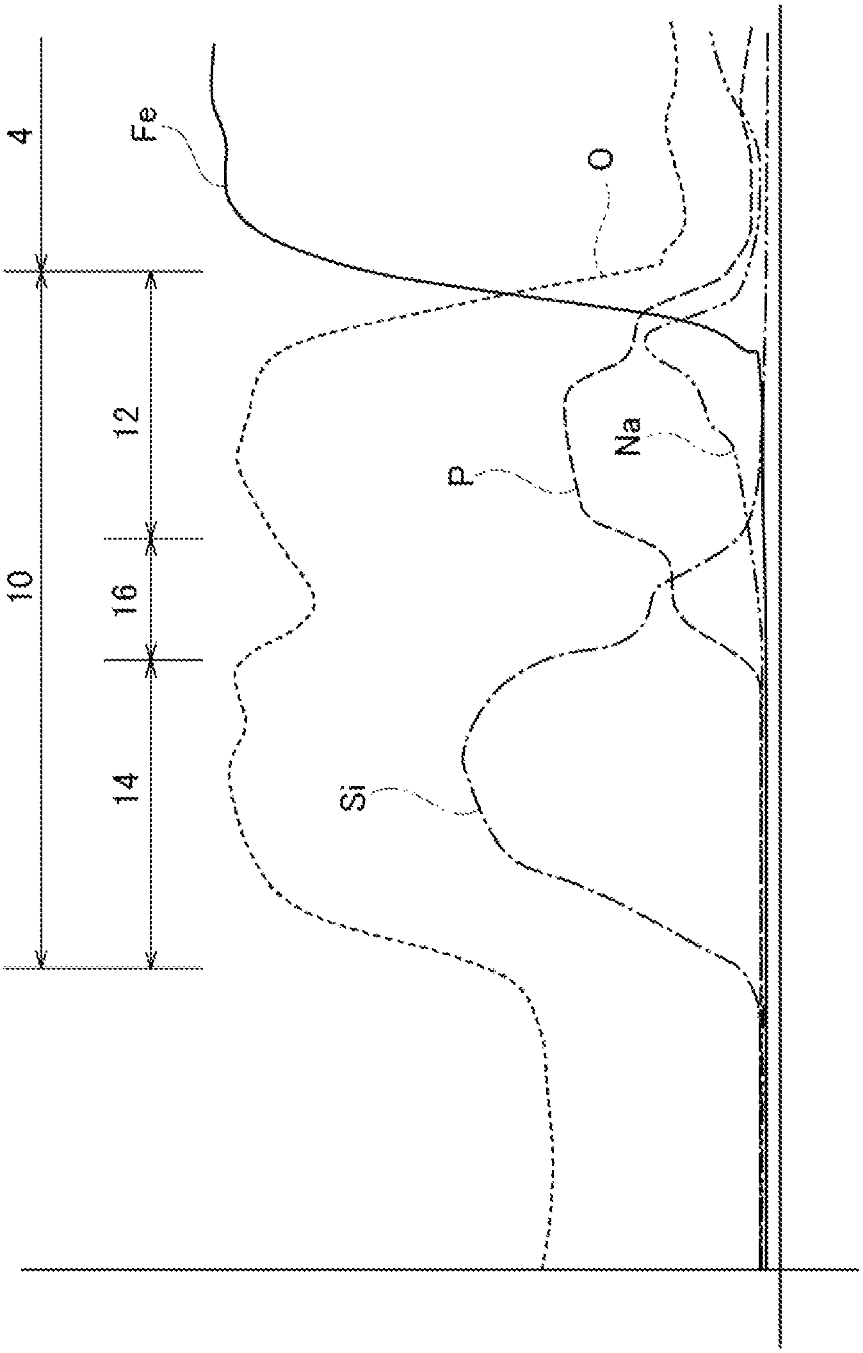
FIG. 6 is a schematic view showing a result of film analysis using TEM-EDS along a measurement line VI in FIG. 5.

The second embodiment describes an embodiment including the intermediate layer 16 in the inorganic insulating film 10 based on FIGS. 5 and 6. Regarding the structure of the second embodiment in common with that of the first embodiment, description is omitted, and the same numerals are used.

As in the first embodiment, the soft magnetic powder 1 according to the second embodiment includes the coated particles 2, which are the soft magnetic metal particles 4 on whose surface the inorganic insulating film 10 is formed. FIG. 5 is a schematic view showing an enlarged cross-section in the vicinity of the surface of the coated particle 2 in the second embodiment. As shown in FIG. 5, the inorganic insulating film 10 includes the first coating part 12 and the second coating part 14 described in the first embodiment, and is separated into at least two layers. Between the first coating part 12 and the second coating part 14, the intermediate layer 16 is formed in the second embodiment. The first coating part 12 is in contact with the outermost surface of the soft magnetic metal particle 4 and covers the surface. The second coating part 14 is formed at the outer side of the first coating part 12, with the intermediate layer 16 sandwiched between the second coating part 14 and the first coating part 12.

FIG. 6 schematically shows a result of the film analysis using TEM-EDS along the measurement line VI in FIG. 5. The horizontal axis of FIG. 6 corresponds to the longitudinal direction of the measurement line VI, whereas the vertical axis of FIG. 6 shows the content rate (atom %) of each detected element, as in FIG. 4 of the first embodiment. That is, the right part of FIG. 6 shows the component ratio in the vicinity of the surface of the soft magnetic metal particle 4, the central part of FIG. 6 shows the component ratio of the inorganic insulating film 10, and the left part of FIG. 6 shows the component ratio of the resin used to fix the sample in TEM observation. FIG. 6 shows only the behavior of the content of main elements (elements necessary for interpreting the present disclosure), having information of an unnecessary element (e.g., carbon (C)) being deleted from the raw data obtained through the film analysis using TEM-EDS.

As shown in FIG. 6, the intermediate layer 16 includes phosphorus (P), silicon (Si), and oxygen, and is a diffusion layer comprising the components of the first coating part 12 and the second coating part 14. The diffusion layer 16 is an area in the inorganic insulating film 10 that comprises at least 5 atom % of phosphorus (P) and at least 5 atom % of silicon (Si) while the content rate of P is 0.7-1.5 times that of Si.

In the second embodiment, forming the intermediate layer 16 between the first coating part 12 and the second coating part 14 increases the affinity between the first coating part 12 and the second coating part 14 and makes the inorganic insulating film 10 less likely to be destroyed. Consequently, the soft magnetic powder 1 according to the second embodiment and the dust core 110 including the soft magnetic powder 1 show higher heat resistance than when the intermediate layer 16 is not present.

The thickness of the inorganic insulating film 10 in the second embodiment is described next. In the second embodiment, as shown in FIG. 5, the total thickness (S1) of the inorganic insulating film 10 is represented by the sum of the thickness ($T_1$) of the first coating part 12, the thickness ($T_2$) of the second coating part 14, and the thickness (M1) of the intermediate layer 16. Although not shown in FIG. 5 or FIG. 6, a fourth layer other than the layers 12-16 may be formed in the inorganic insulating film 10. However, the total thickness (S1) of the inorganic insulating film 10 is 200 nm or less, preferably satisfies 10 nm≤S1≤170 nm, and more preferably satisfies 25 nm≤S1≤150 nm.

The thickness (M1) of the intermediate layer 16 exceeds at least 0.4 nm. As explained in the description of the first embodiment, the intermediate layer 16 is deemed to be not present when the thickness M1 is 0.4 nm or less. The ratio of the thickness (M1) of the intermediate layer 16 to the total thickness (S1) of the inorganic insulating film 10 is preferably 0.05<M1/S1≤0.2, and more preferably 0.07≤M1/S1≤0.12.

A thicker (e.g., S1 is 200 nm or more) insulating film covering a particle surface normally tends to increase electrical resistance of a soft magnetic powder but reduce permeability. Conversely, a thinner insulating film covering the particle surface tends to increase the permeability but reduce the electrical resistance. In accordance with the thickness of the insulating film, the electrical resistance and the permeability thus have a contradicting tendency. In the second embodiment, forming the intermediate layer 16 having the predetermined thickness as described above allows for high insulating properties and high permeability at the same time even when the total thickness S1 of the inorganic insulating film 10 is thin. Consequently, the soft magnetic powder 1 according to the second embodiment and the dust core 110 including the soft magnetic powder 1 can prevent the reduction of the insulation resistance and show high permeability even when exposed to the high temperature environment for a long time.

The thickness ($T_1$) of the first coating part 12 and the thickness ($T_2$) of the second coating part 14 in the second embodiment are preferably the same as those in the first embodiment. That means the ratio of the thickness ($T_2$) of the second coating part 14 to the sum ($T_1+T_2$) of the thickness of the first coating part 12 and the thickness of the second coating part 14 preferably satisfies $20\% \le T_2/(T_1+T_2) \le 90\%$, and more preferably satisfies $50\% \le T_2/(T_1+T_2) \le 80\%$. Satisfying the above-described characteristics, the soft magnetic powder 1 and the dust core 110 according to the second embodiment have further improved heat resistance and further improved permeability.

As in the first embodiment, the first coating part 12 preferably includes the predetermined amount of the addition element α or β in the second embodiment. Including at least one of the addition elements α or at least one of the addition elements β in the first coating part 12 tends to further improve the heat resistance of the soft magnetic powder 1 and the dust core 110.

The thickness and the component of each of the layers 12, 14, and 16 in the second embodiment can be analyzed in the film analysis using TEM-EDS, as in the first embodiment.

A method of manufacturing the soft magnetic powder 1 according to the second embodiment is described next. In the second embodiment, the first coating part 12 may be formed through the phosphate treatment, and the second coating part 14 may be formed through the sol-gel coating using the silane coupling agent, as in the first embodiment. To form the intermediate layer 16 between the first coating part 12 and the second coating part 14, the soft magnetic powder 1 is heated under predetermined conditions after the second coating part 14 is formed through the sol-gel coating.

Specifically, to form the intermediate layer 16 through the heat treatment, the soft magnetic powder 1 in which the second coating part 14 is formed is heated for about 10-30 minutes at a temperature ranging from 400-600° C. in a nitrogen atmosphere ($N_2$) or a vacuum atmosphere. The heating rate in the heat treatment is preferably 5-10° C./minute. Alternatively, the cooling rate may be controlled to 5-10° C./minute. The heat treatment may comprise two stages, in which the soft magnetic powder 1 is once held for 3-5 minutes at a temperature ranging from 400-500° C. and then held for 7-25 minutes at a higher temperature ranging from 500-600° C.

To thicken the thickness M1 of the intermediate layer 16, the holding temperature may be set higher, around 550-600° C., or the holding time may be longer, around 25-30 minutes, in the above heat treatment. Alternatively, the heating rate may be slower, around 5-7° C./minute, or the cooling rate may be slower, around 5-7° C./minute. To make the thickness (M1) of the intermediate layer 16 thin, each factor may be controlled to the opposite direction of the above direction.

Except for the conditions of the heat treatment as described above, the soft magnetic powder 1 may be manufactured under the same manufacturing conditions as in the first embodiment. The dust core and the inductor element may also be manufactured in the same manner as in the first embodiment, thus description is omitted.

Third Embodiment

A third embodiment of the present disclosure is described below based on FIG. 7. Regarding the structure of the third embodiment in common with the structures of the first and second embodiments, description is omitted, and the same numerals are used.

Figure 7:
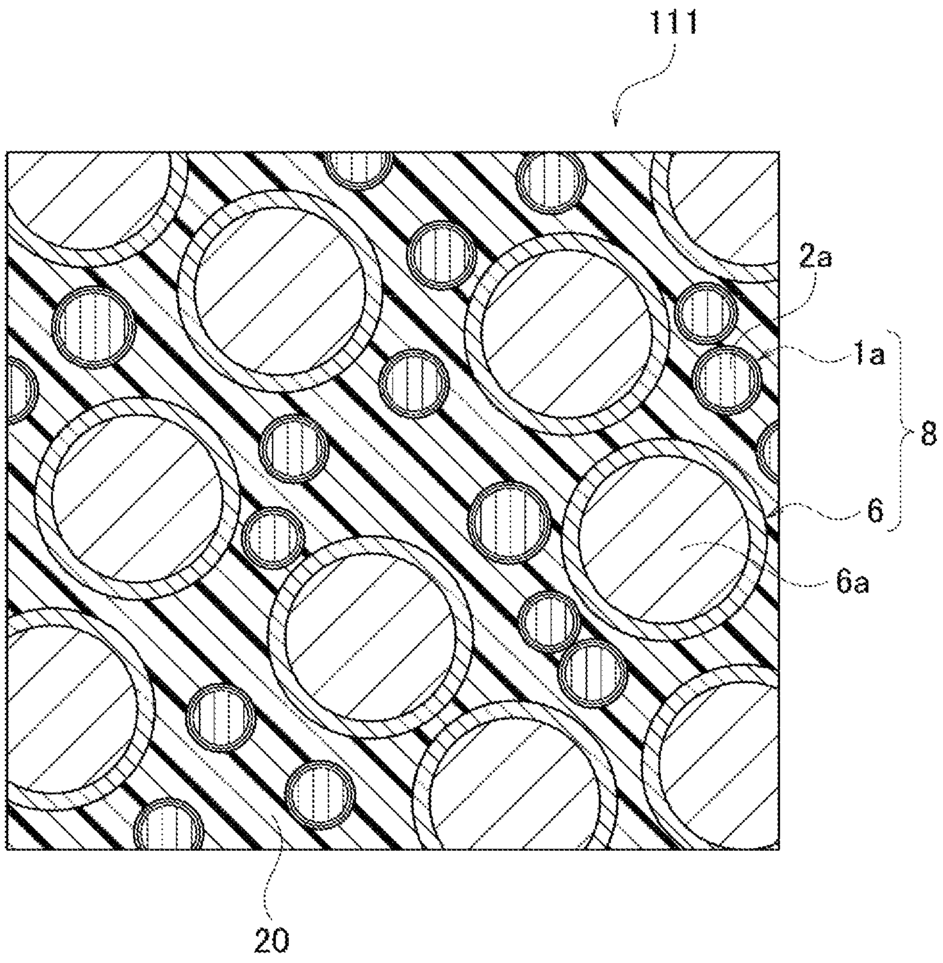
FIG. 7 is a schematic view showing a part of an enlarged cross-section of a microstructure of a dust core according to a third embodiment.

FIG. 7 is a schematic view showing a part of an enlarged cross-section of a microstructure of a dust core 111 according to the third embodiment. As shown in FIG. 7, a soft magnetic powder 8 is fixed using a resin 20 as the binder in the third embodiment as well. However, in the third embodiment, the soft magnetic powder 8 comprises multiple powders with different particle size distributions. Specifically, the soft magnetic powder 8 includes a large-size powder 6 having a relatively large diameter and a small-size powder 1*a* having a relatively small diameter.

The large-size powder 6 preferably has a particle size distribution within a range of 200 μm or less, and a median diameter (D50) of 20-30 μm. The small-size powder 1*a* preferably has a particle size distribution within a range of 15 μm or less, and a median diameter (D50) that is 0.1-0.25 times smaller than that of the large-size powder 6, or more specifically a median diameter (D50) of 3-5 μm. Additionally, D90 in the particle size distribution of the small-size powder 1*a* is preferably 10 μm or less.

To measure the particle diameter "d" and the particle size distribution of each of the large-size powder 6 and the small-size powder 1*a* through the image analysis by observation of cross-sections in the third embodiment, the following procedure is performed. First, the area of each metal particle in an observation region of 400 μm squared is calculated, as in the first embodiment. Using the area value, the circle equivalent diameter of each metal particle is calculated. The above measurement is preferably performed at least at 30 regions in the third embodiment as well. Then, the metal particles are classified into a particle group having a circle equivalent diameter of less than 15 μm or a particle group having a circle equivalent diameter of 15 μm or larger in the third embodiment. The particle group of less than 15 μm is defined as the small-size powder 1*a*, and its particle size distribution and particle diameters at each cumulative frequency are calculated. The particle group of 15 μm or larger is defined as the large-size powder 6, and its particle size distribution and particle diameters at each cumulative frequency are calculated.

The proportion of the small-size powder 1*a* occupying the soft magnetic powder 8 in the third embodiment is preferably 5-40% and more preferably 10-30% in terms of weight. The proportion of the small-size powder 1*a* can be measured not only in its manufacturing process but also after the dust core 111 is prepared. To measure the proportion after the dust core 111 is manufactured, a cross-section of the dust core 111 may be observed using SEM or the like.

In this manner, using the powders with different particle sizes enables the dust core 111 to have a high packing rate of the soft magnetic powder 8, showing a tendency of further improved magnetic properties.

An insulating film is formed on a surface of each core particle 2*a* constituting the small-size powder 1*a*. The core particles 2*a* of the small-size powder 1*a* in the third embodiment correspond to the coated particles 2 in the first embodiment or the coated particles 2 in the second embodiment. That is, the surface of each core particle 2*a* constituting the small-size powder 1*a* is covered with the inorganic insulating film 10, which is the multilayer film including the first coating part 12 containing phosphorus and oxygen and the second coating part 14 containing silicon and oxygen.

As shown in FIG. 7, the particles of the small-size powder 1*a* are present in the particle gaps of large-size powder 6 in the dust core 111. When the powders with different particle sizes are used, the small-size powder 1*a* existing in the particle gaps of large-size powder 6 contributes a lot to the insulating properties of the dust core. Having the first coating part 12 and the second coating part 14 on the surface of each core particle 2*a* of the small-size powder 1*a* can thus efficiently improve the insulating properties of the dust core 111.

On a surface of each core particle 6*a* of the large-size powder 6, an insulating film may or may not be formed, either a phosphate compound film or a silicon-based oxide may be formed, or the multilayer film may be formed as in the small-size powder 1*a*.

However, because the large-size powder 6 contributes a lot to the magnetic properties, it is better to minimize the existence of a non-magnetic material (e.g., film component). Therefore, forming only the silicon-based oxide film attributable to TEOS on the surface of each core particle 6*a* of the large-size powder 6 is more preferable (meaning that, forming only a film corresponding to the second coating part 14 is more preferable). This structure can minimize the effect exerted by the insulating film on the magnetic properties (e.g., permeability), further improving the magnetic properties of the dust core 111.

The material of the core particles constituting the large-size powder 6 and the material of the core particles constituting the small-size powder 1*a* may both be various soft magnetic metal particles containing Fe, as in the first embodiment. The core particles of the large-size powder 6 and the core particles of the small-size powder 1*a* may comprise the same material or different materials.

Because the small-size powder 1*a* in the third embodiment comprises the coated particles 2 of the first embodiment or the coated particles 2 of the second embodiment, the soft magnetic powder and the dust core according to the third embodiment demonstrate the same effects as in the first embodiment and/or the second embodiment.

Although the embodiments of the present disclosure have been described above, the present invention is not limited to the above embodiments. Various modifications can be made to the present disclosure without departing from the scope of the invention. For example, while the above embodiments show the inductor element 100 having the dust core 110 and the coil 120 embedded inside the dust core 110, an embodiment of the inductor element is not limited, and may have a dust core in a predetermined shape having a wire wound for a predetermined number of times on a surface of the dust core. In this case, the shape of the dust core may be, for example, the FT type, ET type, EI type, UU type, EE type, EER type, UI type, drum type, toroidal type, pot type, cup type, and the like.

Although the soft magnetic powder 1 is kneaded with the resin as the binder to manufacture the dust core in the above embodiments, a lubricant such as soap scum may be used instead of the resin. In this case, soap scum such as zinc oleate and zinc stearate is kneaded with the soft magnetic powder 1. Heat and pressure are then applied to the mixture so that the molded body having any shape can be obtained. The heat treatment is then performed for the molded body at about 450-600° C. so that the dust core can be obtained.

Although the soft magnetic powder 8 comprises the two different types of the powders having different sizes in the third embodiment, the soft magnetic powder may comprise three types of powders. For example, the soft magnetic powder may include an intermediate-size powder having a D50 smaller than the large-size powder 6 and larger than the small-size powder 1*a*, in addition to the large-size powder 6 and the small-size powder 1*a*. Even in this case, the small-size powder preferably comprises the coated particles 2 shown in FIG. 2 as in the third embodiment, and the intermediate-size powder may comprise the coated particles 2 or the uncoated particles.

Although the inductor element is described as an example of an electronic component in the above embodiments, the present disclosure can be applied to other electronic components, such as a transformer, a choke coil, and a reactor coil, in the perspective of heat resistance.

EXAMPLES

Hereinafter, the present disclosure is described based on further detailed examples, but the present invention is not limited to these examples.

Experiment A

In Experiment A, metal particles with an inorganic insulating film 10 comprising a first coating part 12 and a second coating part 14 were used to prepare a soft magnetic powder sample and dust core samples according to Example A1, and their performance were evaluated. Additionally, in Experiment A, multiple kinds of phosphate solutions including different types and amounts of addition elements were used in phosphate treatment to prepare soft magnetic powder samples and dust core samples according to Examples A2-A28. A manufacturing method used for each Example in Experiment A is described below.

Example A1

Two types of powders, which were a small-size powder and a large-size powder, were prepared first as the raw materials of the soft magnetic powder. Specifically, a powder that was made of pure iron and had a median diameter (D50) of 5 μm was prepared as the small-size powder, and a powder that was made of 93.5Fe-6.5Si and had a median diameter (D50) of 25 μm was prepared as the large-size powder.

The prepared small-size powder was then coated with the inorganic insulating film in accordance with the following procedure. The phosphate treatment was first applied to the small-size powder to form the first coating part on a surface of each core particle of the small-size powder. The small-size powder was then soaked in an ethanol solution including TEOS, and the solution was stirred. After that, the small-size powder was dried under predetermined conditions. This further formed the second coating part on the outer side of the first coating part.

On the other hand, the large-size powder was subjected only to sol-gel coating using TEOS to form a silicon-based oxide film on a surface of each core particle of the large-size powder.

The soft magnetic powder sample of Example A1 was obtained by mixing the small-size powder and the large-size powder thus obtained at a predetermined ratio. In the present example, the proportion of the small-size powder to the entire soft magnetic powder was 30% by weight.

Next, using the soft magnetic powder sample of Example A1, the dust core samples were prepared in accordance with the following procedure. The soft magnetic powder including the small-size powder and the large-size powder was first kneaded with epoxy resin diluted with acetone. The mixture was then dried at 50° C. for 120 hours. The dried mixture was then classified using a sieve with an opening of 400 μm. Granules, or the raw material of the dust core, were thus obtained. The amount of the epoxy resin was 4 parts by mass with respect to 100 parts by mass of the soft magnetic powder. The above granules were filled into a toroidal-shaped mold and were then compressed at a pressure of 6 t/cm$^2$ (about 6×10$^2$ MPa). The molded bodies obtained by the pressing process were then heated at 200° C. for 180 minutes in air atmosphere. The dust core samples were thus obtained.

Each of the dust core samples of Example A1 obtained in accordance with the above procedure had an outer diameter of 17.5 mm, an inner diameter of 10.5 mm, and a height of 5.0 mm.

Examples A2-A10

In each of Examples A2-A10, using a phosphate solution including Na as the addition element α in the phosphate treatment to form the first coating part, the small-size powder was obtained. The concentration of Na-containing phosphate in each phosphate solution used in Examples A2-A10 was changed to adjust the content ratio of Na included in the first coating part. The experimental conditions of Examples A2-A10 were the same as those in Example A1, except for the above conditions. Under such conditions, the soft magnetic powder samples and the dust core samples according to Examples A2-A10 were prepared.

Examples A11-A18

In each of Examples A11-A18, the addition element α was changed to an element other than Na to form the first coating part on the surface of each core particle of the small-size powder. The content ratio (α/P) of the addition element α was set to 0.1 in Examples A11-A18. The experimental conditions of Examples A11-A18 were the same as those in Example A1, except for the above conditions. Under such conditions, the soft magnetic powder samples and the dust core samples according to Examples A11-A18 were prepared.

Examples A19-A25

In each of Examples A19-A25, using a phosphate solution including Zn as the addition element β in the phosphate treatment to form the first coating part, the small-size powder was obtained. The concentration of Zn-containing phosphate in each phosphate solution used in Examples A19-A25 was changed to adjust the content ratio of Zn included in the first coating part. The experimental conditions of Examples A19-A25 were the same as those in Example A1, except for the above conditions. Under such conditions, the soft magnetic powder samples and the dust core samples according to Examples A19-A25 were prepared.

Examples A26-A28

In each of Examples A26-A28, Al instead of Zn was added as the addition element β to form the first coating part on the surface of each core particle of the small-size powder. The experimental conditions of Examples A26-A28 were the same as those in Example A1, except for the above condition. Under such conditions, the soft magnetic powder samples and the dust core samples according to Examples A26-A28 were prepared.

Comparative Example A1

In Comparative Example A1, only a phosphate compound film was formed on the surface of each core particle of the small-size powder, and the sol-gel coating using TEOS was not performed. Except for the above conditions, the experimental conditions were the same as those in Example A1. Under such conditions, the soft magnetic powder sample and the dust core samples according to Comparative Example A1 were prepared.

Comparative Example A2

In Comparative Example A2, the phosphate treatment was not applied to the small-size powder, and only the sol-gel coating using TEOS was performed to form only a silicon-based oxide film on the surface of each core particle of the small-size powder. Except for the above conditions, the experimental conditions were the same as those in Example A1. Under such conditions, the soft magnetic powder sample and the dust core samples according to Comparative Example A2 were prepared.

Comparative Example A3

In Comparative Example A3, only the phosphate compound film was formed on the surface of each core particle of the small-size powder as in Comparative Example A1. However, a phosphate solution including Na as the addition element α was used in the phosphate treatment in Comparative Example A3. Except for the above conditions, the experimental conditions were the same as those in Example A1. Under such conditions, the soft magnetic powder sample and the dust core samples according to Comparative Example A3 were prepared.

Comparative Example A4

In Comparative Example A4, only the phosphate compound film was formed on the surface of each core particle of the small-size powder as in Comparative Example A1. However, a phosphate solution including Zn as the addition element β was used in the phosphate treatment in Comparative Example A4. Except for the above conditions, the experimental conditions were the same as those in Example A1. Under such conditions, the soft magnetic powder sample and the dust core samples according to Comparative Example A4 were prepared.

The following evaluations were performed for the dust cores according to each Example and each Comparative Example.

Analysis of the Inorganic Insulating Film using TEM-EDS

The inorganic insulating film included in the dust core sample was analyzed using the TEM observation. In the TEM observation, line analysis using EDS was performed for at least 10 regions of the inorganic insulating film, to measure the component of the inorganic insulating film and the thickness of each layer. The samples for the TEM observation were prepared through a micro sampling method using FIB.

Heat Resistance Test

A heat resistance test was performed for the dust core sample. In the heat resistance test, the dust core sample was exposed to a high temperature environment at 155° C. for 2000 hours, and then the insulation resistance was measured. The insulation resistance was measured using a 4339B High Resistance Meter manufactured by Hewlett-Packard Company after electrode terminals were formed by applying an In—Ga paste on both surfaces of the toroidal-shaped dust core.

In all Examples and Comparative Examples, the insulation resistance before the heat resistance test was about $1\times10^{14}$ Ω/mm at around the same level. Therefore, in the present experiment, the dust core having higher insulation resistance after the test is deemed to have better heat resistance.

Table 1 shows the evaluation results of Comparative Examples A1-A3 and Examples A1-A18. Table 2 shows the evaluation results of Comparative Example A4 and Examples A19-A28.

TABLE 1

| Sample No. | Composition of inorganic insulating film: First coating part: Main component | Addition element α | Content ratio of addition element α/P (—) | Second coating part Main component | Dust core properties Insulation resistance after heat resistance test Ω/mm |
|---|---|---|---|---|---|
| Comparative Example A1 | P, O | — | — | — | $1.35 \times 10^4$ |
| Comparative Example A2 | — | — | — | Si, O | $1.35 \times 10^4$ |
| Comparative Example A3 | P, O | Na | 0.2 | — | $5.13 \times 10^4$ |
| Example A1 | P, O | — | — | Si, O | $6.33 \times 10^9$ |
| Example A2 | P, O | Na | 0.04 | Si, O | $6.66 \times 10^9$ |
| Example A3 | P, O | Na | 0.05 | Si, O | $2.04 \times 10^{10}$ |
| Example A4 | P, O | Na | 0.1 | Si, O | $2.82 \times 10^{10}$ |
| Example A5 | P, O | Na | 0.2 | Si, O | $3.39 \times 10^{10}$ |
| Example A6 | P, O | Na | 0.3 | Si, O | $3.45 \times 10^{10}$ |
| Example A7 | P, O | Na | 0.5 | Si, O | $1.91 \times 10^{10}$ |
| Example A8 | P, O | Na | 0.7 | Si, O | $6.60 \times 10^9$ |
| Example A9 | P, O | Na | 0.9 | Si, O | $6.56 \times 10^9$ |
| Example A10 | P, O | Na | 0.95 | Si, O | $6.49 \times 10^9$ |
| Example A11 | P, O | Li | 0.1 | Si, O | $1.58 \times 10^{10}$ |
| Example A12 | P, O | K | 0.1 | Si, O | $1.32 \times 10^{10}$ |
| Example A13 | P, O | Rb | 0.1 | Si, O | $2.04 \times 10^{10}$ |
| Example A14 | P, O | Cs | 0.1 | Si, O | $2.57 \times 10^{10}$ |
| Example A15 | P, O | Mg | 0.1 | Si, O | $1.29 \times 10^{10}$ |
| Example A16 | P, O | Ca | 0.1 | Si, O | $2.04 \times 10^{10}$ |
| Example A17 | P, O | Sr | 0.1 | Si, O | $2.82 \times 10^{10}$ |
| Example A18 | P, O | Ba | 0.1 | Si, O | $2.34 \times 10^{10}$ |

TABLE 2

| Sample No. | Composition of inorganic insulating film: First coating part: Main component | Addition element β | Content ratio of addition element β/P (—) | Second coating part Main component | Dust core properties Insulation resistance after heat resistance test Ω/mm |
|---|---|---|---|---|---|
| Comparative Example A1 | P, O | — | — | — | $1.35 \times 10^4$ |
| Comparative Example A4 | P, O | Zn | 0.5 | — | $5.13 \times 10^4$ |
| Example A1 | P, O | — | — | Si, O | $6.33 \times 10^9$ |
| Example A19 | P, O | Zn | 0.1 | Si, O | $6.42 \times 10^9$ |
| Example A20 | P, O | Zn | 0.3 | Si, O | $6.71 \times 10^9$ |
| Example A21 | P, O | Zn | 0.5 | Si, O | $5.21 \times 10^{10}$ |
| Example A22 | P, O | Zn | 0.7 | Si, O | $6.92 \times 10^{10}$ |
| Example A23 | P, O | Zn | 0.8 | Si, O | $4.15 \times 10^{10}$ |
| Example A24 | P, O | Zn | 0.9 | Si, O | $6.39 \times 10^9$ |
| Example A25 | P, O | Zn | 0.95 | Si, O | $6.35 \times 10^9$ |
| Example A26 | P, O | Al | 0.5 | Si, O | $1.70 \times 10^{10}$ |
| Example A27 | P, O | Al | 0.7 | Si, O | $2.69 \times 10^{10}$ |
| Example A28 | P, O | Al | 0.8 | Si, O | $2.34 \times 10^{10}$ |

From the results of the measurement using TEM-EDS, it was confirmed that the first coating part whose main component included P and O and the second coating part whose main component included Si and O were formed on the surface of each core particle of the small-size powder in all Examples A1-A28 in Experiment A. In all Examples A1-A28, the thickness ($T_1$) of the first coating part and the thickness ($T_2$) of the second coating part were both within a range of 19-31 nm. On the other hand, in Comparative Examples A1, A3, and A4, it was confirmed that only the phosphate compound film having a thickness of about 50 nm was formed on the surface of each core particle of the small-size powder. In Comparative Example 2, it was confirmed that only the silicon-based oxide film having a thickness of about 50 nm was formed on the surface of each core particle of the small-size powder. It was also confirmed that the total thickness of the inorganic insulating film was about the same in all Examples and Comparative Examples in Experiment A.

Although not shown in Table 1 or Table 2, the film analysis using TEM-EDS was also performed for the large-diameter powder included in each dust core sample, as was performed for the small-size powder. The average thickness of the silicon-based oxide film formed on the large-diameter powder was 50 nm in all Examples and Comparative Examples.

From the results of the measurement using TEM-EDS, it was confirmed that the addition element (α or β) was included in the first coating part as intended at a predetermined content ratio in Examples A2-A28 and Comparative Examples A3-A4, as shown in Tables 1 and 2.

Next, the results of the heat resistance test are studied. The insulation resistance after the heat resistance test was reduced to the order of $10^4$ in Comparative Examples A1 and A2 as shown in Table 1. It was thus confirmed that the heat resistance in these Comparative Examples were not sufficient. On the other hand, the insulation resistance after the test in Examples A1-A18 according to the present disclosure was higher than that in Comparative Examples A1 and A2, despite the total film thickness in Examples A1-A18 being about the same as that in Comparative Examples A1 and A2. It was thus confirmed that forming the first coating part and the second coating part on the surface of the metal particles improved the heat resistance.

In Experiment A, the first coating part of Example A1 does not contain any addition element α, and the first coating part of Examples A1-A10 include Na as the addition element α. By comparing Example A1 and Examples A2-A10, it was confirmed that, in Examples A3-A7 having a Na content ratio (α/P) within a range of 0.05-0.5, the insulation resistance after the heat resistance test was high ($10^{10}$ Ω/mm or more) and the heat resistance was improved by a greater degree than in Example A1.

Even though Na was included at a content ratio (α/P) of 0.2 in Comparative Example A3 in which only the first coating part was formed, the insulation resistance after the heat resistance test did not improve so much, compared to Comparative Example A1 which did not contain Na. It was thus confirmed that the heat resistance did not improve in Comparative Example A3 compared to Comparative Example A1.

These results proved that forming the multilayer film having the first coating part and the second coating part, and including the addition element α in the first coating part at the predetermined ratio ($0.05 \le \alpha/P \le 0.5$) further improved the heat resistance. It was also confirmed that, in Examples A11-A18 including an element other than Na, including the addition element α at the predetermined ratio allowed for higher insulation resistance after the heat resistance test compared to Example A1 and further improved the heat resistance, as in Examples A3-A7.

Even though Zn was included at a content ratio (β/P) of 0.5 in Comparative Example A4 in which only the first coating part was formed, the insulation resistance after the heat resistance test did not improve so much, compared to Comparative Example A1 which did not contain Zn, as shown in Table 2. It was thus confirmed that the heat resistance did not improve in Comparative Example A4 compared to Comparative Example A1.

In contrast, among Examples A19-A25 having the first coating part and the second coating part, it was confirmed that Examples A21-A23 with a Zn content ratio (β/P) within a range of 0.5-0.8 had high insulation resistance after the heat resistance test and that the heat resistance in Examples A21-A23 was improved by a greater degree than in Example A1. The similar tendency of Examples A19-A25 was observed in Examples A26-A28 that included Al instead of Zn. It was confirmed that including Al at a content ratio within a range of 0.5-0.8 allowed for higher insulation resistance after the heat resistance test compared to Example A1, and further improved the heat resistance.

The results shown in Table 2 thus proved that forming the multilayer film having the first coating part and the second coating part, and including the addition element β in the first coating part at the predetermined ratio ($0.5 \le \beta/P \le 0.8$) further improved the heat resistance.

Experiment B1

In Experiment B1, multiple types of metal particles, each having a different thickness ($T_1$) of the first coating part 12 and a different thickness ($T_2$) of the second coating part 14, were manufactured. These metal particles were used to prepare the soft magnetic powder samples and the dust core samples according to Examples B1-B28. A manufacturing method used for each Example in Experiment B1 is described below.

Examples B1-B11

Two types of powders, which were the small-size powder and the large-diameter powder, were prepared first as the raw materials of the soft magnetic powder. Specifically, a powder that was made of pure iron and had a median diameter (D50) of 5 μm was prepared as the small-size powder, and a powder that was made of 93.5Fe-6.5Si and had a median diameter (D50) of 25 μm was prepared as the large-diameter powder.

The prepared small-size powder was then coated with the inorganic insulating film in accordance with the following procedure. The phosphate treatment was first applied to the small-size powder to form the first coating part on the surface of each core particle of the small-size powder. The small-size powder was then soaked in an ethanol solution including TEOS, and the solution was stirred. After that, the small-size powder was dried under the predetermined conditions. This further formed the second coating part on the outer side of the first coating part.

In the inorganic insulating film coating process of the experiment, the concentration of the phosphate solution and the TEOS concentration were changed to prepare 11 types of the small-size powders having different thicknesses ($T_1$) of the first coating part and thicknesses ($T_2$) of the second coating part. The thickness of each layer was controlled so that the sum ($T_1+T_2$) of the thickness of the first coating part and the thickness of the second coating part was controlled within a range of 50±2 μm for each of the 11 types of the small-size powders.

The large-diameter powder was subjected only to the sol-gel coating using TEOS to form the silicon-based oxide film on the surface of each core particle of the large-diameter powder.

The soft magnetic powder sample according to each of Examples B1-B11 was prepared by mixing the small-size powder and the large-diameter powder thus obtained at a predetermined ratio. The proportion of the small-size powder to the entire soft magnetic powder was common in all Examples in Experiment B1, and was 30% by weight.

Next, the soft magnetic powder sample of each of Examples B1-B11 was used to prepare the dust cores having the same dimensions as in Experiment A, under the same manufacturing conditions as in Experiment A. The dust core samples according to Examples B1-B11 were thus obtained.

Examples B21-B28

In Experiment B1, eight types of the small-size powders having different sums ($T_1+T_2$) of the thickness of the first coating part and the thickness of the second coating part were prepared, while $T_2/(T_1+T_2)$ was set to about 60%. Except for the above conditions, the experimental conditions were the same as those in Examples B1-B11. Under such conditions, the soft magnetic powder samples and the dust core samples of Examples B21-B28 were prepared.

Comparative Example B1

In Comparative Example B1, only the phosphate compound film was formed on the surface of each core particle of the small-size powder, and the sol-gel coating using TEOS was not performed. Except for the above conditions, the experimental conditions were the same as those in Examples B1-B11. Under such conditions, the soft magnetic powder sample and the dust core samples according to Comparative Example B1 were prepared.

Comparative Example B2

In Comparative Example B2, the phosphate treatment was not applied to the small-size powder, and only the sol-gel coating using TEOS was performed to form only the silicon-based oxide film on the surface of each core particle of the small-size powder. Except for the above conditions, the experimental conditions were the same as those in Examples B1-B11. Under such conditions, the soft magnetic powder sample and the dust core samples according to Comparative Example B2 were prepared.

Evaluation in Experiment B1

In Experiment B1, the analysis of the inorganic insulating film using TEM-EDS and the heat resistance test were performed, as in Experiment A. Through the analysis of the inorganic insulating film, it was confirmed that the first coating part whose main component included P and O and the second coating part whose main component included Si and O were formed on the surface of each core particle of the small-size powder in all Examples in Experiment B1. It was also confirmed that only the phosphate compound film was formed on the surface of each core particle of the small-size powder in Comparative Example B1, and only the silicon-based oxide film was formed on the surface of each core particle of the small-size powder in Comparative Example B2. In each Example and each Comparative Example of Experiment B1, an intermediate layer was not formed between the first coating part and the second coating part. In each Example and each Comparative Example of Experiment B1, it was also confirmed that the silicon-based oxide film having an average thickness of 50 nm was formed on the surface of the large-diameter powder included in each dust core sample.

In all Examples and Comparative Examples in Experiment B1, the insulation resistance before the heat resistance test was about $1\times10^{14}$ Ω/mm at around the same level. Therefore, in Experiment B1, the dust core having higher insulation resistance after the test is deemed to have better heat resistance, as in Experiment A.

Additionally, an initial permeability μi (no unit) of each dust core sample was measured in Experiment B1. The initial permeability μi was measured using an LCR meter (LCR428A manufactured by Hewlett-Packard Company) after a wire was wound around the dust core for 50 times. An initial permeability μi of at least 20 is deemed good in Experiment B1.

Table 3 shows the evaluation results of Comparative Examples B1-B2 and Examples B1-B11. Table 4 shows the evaluation results of Examples B21-B28.

TABLE 3

| | Composition of inorganic insulating film | | | | Dust core properties | |
|---|---|---|---|---|---|---|
| Sample No. | Thickness of first coating part $T_1$ (nm) | Thickness of second coating part $T_2$ (nm) | $T_1 + T_2$ (nm) | $T_2/T_1 + T_2$ (%) | Insulation resistance after heat resistance test (Ω/mm) | Permeability μi |
| Comparative Example B1 | 48.9 | 0 | 48.9 | 0.0 | $1.35 \times 10^4$ | 25.1 |
| Comparative Example B2 | 0 | 51 | 51.0 | 100.0 | $5.14 \times 10^4$ | 25.1 |
| Example B1 | 44.3 | 4.4 | 48.7 | 9.0 | $1.26 \times 10^6$ | 24.9 |
| Example B2 | 40.5 | 9.7 | 50.2 | 19.3 | $2.51 \times 10^6$ | 25.4 |
| Example B3 | 39.4 | 10.3 | 49.7 | 20.7 | $1.12 \times 10^7$ | 24.8 |
| Example B4 | 37.4 | 13.2 | 50.6 | 26.1 | $1.32 \times 10^7$ | 24.7 |
| Example B5 | 34.1 | 15.1 | 49.2 | 30.7 | $3.16 \times 10^8$ | 25.5 |
| Example B6 | 30.2 | 19.5 | 49.7 | 39.2 | $8.71 \times 10^8$ | 24.7 |
| Example B7 | 24.3 | 23.9 | 48.2 | 49.6 | $2.24 \times 10^9$ | 25.0 |
| Example B8 | 20.1 | 30.2 | 50.3 | 60.0 | $6.92 \times 10^9$ | 25.1 |

TABLE 3-continued

| | Composition of inorganic insulating film | | | | Dust core properties | |
|---|---|---|---|---|---|---|
| Sample No. | Thickness of first coating part $T_1$ (nm) | Thickness of second coating part $T_2$ (nm) | $T_1 + T_2$ (nm) | $T_2/T_1 + T_2$ (%) | Insulation resistance after heat resistance test (Ω/mm) | Permeability μi |
| Example B9 | 10.2 | 39.1 | 49.3 | 79.3 | $2.51 \times 10^9$ | 25.2 |
| Example B10 | 4.8 | 44.1 | 48.9 | 90.2 | $1.29 \times 10^7$ | 25.1 |
| Example B11 | 1.2 | 48.8 | 50.0 | 97.6 | $7.76 \times 10^6$ | 24.7 |

TABLE 4

| | Composition of inorganic insulating film | | | | Dust core properties | |
|---|---|---|---|---|---|---|
| Sample No. | Thickness of first coating part $T_1$ (nm) | Thickness of second coating part $T_2$ (nm) | $T_1 + T_2$ (nm) | $T_2/T_1 + T_2$ (%) | Insulation resistance after heat resistance test (Ω/mm) | Permeability μi |
| Example B21 | 3.2 | 4.8 | 8.0 | 60.0 | $3.16 \times 10^6$ | 29.1 |
| Example B22 | 4.1 | 6.2 | 10.3 | 60.2 | $1.26 \times 10^8$ | 28.4 |
| Example B23 | 12.1 | 18.3 | 30.4 | 60.3 | $3.47 \times 10^9$ | 27.4 |
| Example B24 | 20.1 | 30.2 | 50.3 | 60.0 | $6.92 \times 10^9$ | 25.1 |
| Example B25 | 29.8 | 43.3 | 73.1 | 59.2 | $8.91 \times 10^9$ | 24.2 |
| Example B26 | 41.9 | 64.2 | 106.1 | 60.5 | $9.12 \times 10^9$ | 22.5 |
| Example B27 | 60.4 | 88.3 | 148.7 | 59.3 | $9.55 \times 10^9$ | 20.5 |
| Example B28 | 80.8 | 123.7 | 204.5 | 60.5 | $9.33 \times 10^9$ | 18.7 |

The insulation resistance after the heat resistance test was reduced to the order of $10^4$ in Comparative Examples B1 and B2 as shown in Table 3. It was thus confirmed that the heat resistance in these Comparative Examples B1 and B2 were not sufficient. On the other hand, the insulation resistance after the test in Examples B1-B11 was higher than that in Comparative Examples B1 and B2, despite the total film thickness in Examples B1-B11 being about the same as that in Comparative Examples B1 and B2. It was thus confirmed that forming the first coating part and the second coating part on the surface of the small-size powder improved the heat resistance.

Regarding the thickness of the first coating part and the thickness of the second coating part, when $T_2/(T_1+T_2)$ was 20%-90% (i.e., Examples B3-B10), the insulation resistance after the test was $10^7$ Ω/mm or more and was higher than that in other cases (i.e., Examples B1, B2, and B11). Further, the insulation resistance after the test was $10^8$ Ω/mm or more when $T_2/(T_1+T_2)$ was 30%-80% (i.e., Examples B5-B9), and was $10^9$ Ω/mm or more when $T_2/(T_1+T_2)$ was 50%-80% (i.e., Examples B7-B9).

From these results, it was confirmed that controlling the ratio of the thickness of the first coating part to the thickness of the second coating part within the predetermined range further improved the heat resistance.

As shown in Table 4, it was confirmed that thickening the sum $(T_1+T_2)$ of the thickness of the first coating part and the thickness of the second coating part tended to increase the insulation resistance after the heat resistance test. Conversely, the initial permeability μi tended to decrease in accordance with the increase of the film thickness. Especially in Example B28 having a sum $(T_1+T_2)$ of 150 nm or more, the initial permeability μi was reduced to under 20.

In Examples B22-B27 where the sum $(T_1+T_2)$ was 10 nm or more and 150 nm or less, the insulation resistance after the test was as high as $10^8$ Ω/mm or more, and the permeability was 20 or more. These Examples had both sufficient insulating properties and sufficient magnetic properties. Especially in Examples B23-B25 where the sum $(T_1+T_2)$ was 30 nm or more and 80 nm or less, the insulation resistance after the test was as high as $10^9$ Ω/mm or more, and the permeability was increased to 24 or more. From these results, it was confirmed that controlling the ratio of the thickness of the first coating part to the thickness of the second coating part within the predetermined range enabled the insulation resistance after the heat resistance test to stay high and allowed for high permeability at the same time, even when the total thickness of the inorganic insulating film was thin.

Experiment B2

In Experiment B2, $T_1$ and $T_2$ were controlled within optimal ranges, and the addition element α or β was added to the first coating part, during the formation of the inorganic insulating film. Under such conditions, the soft magnetic powder samples and the dust core samples according to Examples B31-B61 were prepared.

Examples B31-B46 and B51-B61

In Examples B31-B61, using the phosphate solution including the addition element α or β in the phosphate treatment to form the first coating part, the small-size powder was obtained. Specifically, the first coating part of the small-size powder in Examples B31-B46 included the addition element α selected from the alkali metals or the alkaline earth metals. Table 5 shows the addition element α in each of Examples B31-B46 and its content ratio (α/P). Similarly, the first coating part of the small-size powder in Examples B51-B61 included the addition element β selected from Zn or Al. Table 6 shows the addition element β in each of Examples B51-B61 and its content ratio (β/P).

In all Examples of Experiment B2, the thickness ($T_1$) of the first coating part was 20±1 nm, and the thickness ($T_2$) of the second coating part was 30±1 nm. That means $T_1+T_2$ was 50±2 nm, and $T_2/(T_1+T_2)$ was 60±2% in all Examples of Experiment B2. Except for the above conditions, the experimental conditions were the same as those in Experiment B1. Under such conditions, the dust core samples of Examples B31-B46 and B51-B61 were prepared. Their performance was evaluated as in Experiment B1. Tables 5 and 6 show the evaluation results of each Example.

TABLE 5

| | Composition of inorganic insulating film | | | | | | Dust core properties | |
|---|---|---|---|---|---|---|---|---|
| Sample No. | Thickness of first coating part $T_1$ (nm) | Thickness of second coating part $T_2$ (nm) | $T_1 + T_2$ (nm) | $T_2/T_1 + T_2$ (%) | Element α | Content ratio of element α α/P (—) | Insulation resistance after heat resistance test (Ω/mm) | Permeability μi |
| Example B31 | 20.1 | 30.2 | 50.3 | 60.0 | — | 0.00 | $6.92 \times 10^9$ | 25.1 |
| Example B32 | 19.7 | 30.5 | 50.2 | 60.8 | Na | 0.03 | $8.91 \times 10^9$ | 25.9 |
| Example B33 | 19.1 | 30.1 | 49.2 | 61.2 | Na | 0.05 | $3.47 \times 10^{11}$ | 24.6 |
| Example B34 | 20.5 | 29.7 | 50.2 | 59.2 | Na | 0.10 | $9.12 \times 10^{11}$ | 25.1 |
| Example B35 | 20.4 | 30.0 | 50.4 | 59.5 | Na | 0.30 | $6.92 \times 10^{11}$ | 25.2 |
| Example B36 | 19.4 | 30.2 | 49.6 | 60.9 | Na | 0.50 | $1.58 \times 10^{11}$ | 24.7 |
| Example B37 | 19.8 | 31.1 | 50.9 | 61.1 | Na | 0.60 | $2.75 \times 10^9$ | 24.9 |
| Example B38 | 19.3 | 30.4 | 49.7 | 61.2 | Na | 0.70 | $1.62 \times 10^9$ | 25.1 |
| Example B39 | 19.7 | 29.5 | 49.2 | 60.0 | Li | 0.10 | $1.26 \times 10^{11}$ | 25.1 |
| Example B40 | 19.9 | 30.0 | 49.9 | 60.1 | K | 0.10 | $1.58 \times 10^{11}$ | 25.2 |
| Example B41 | 20.0 | 29.5 | 49.5 | 59.6 | Rb | 0.10 | $2.51 \times 10^{11}$ | 25.1 |
| Example B42 | 20.5 | 29.8 | 50.3 | 59.2 | Cs | 0.10 | $1.58 \times 10^{11}$ | 24.9 |
| Example B43 | 19.8 | 29.6 | 49.4 | 59.9 | Mg | 0.10 | $1.26 \times 10^{11}$ | 25.1 |
| Example B44 | 19.7 | 29.9 | 49.6 | 60.3 | Ca | 0.10 | $2.51 \times 10^{11}$ | 25.1 |
| Example B45 | 19.8 | 29.8 | 49.6 | 60.1 | Sr | 0.10 | $1.58 \times 10^{11}$ | 24.8 |
| Example B46 | 20.0 | 29.7 | 49.7 | 59.8 | Ba | 0.10 | $1.26 \times 10^{11}$ | 25.1 |

TABLE 6

| | Composition of inorganic insulating film | | | | | | Dust core properties | |
|---|---|---|---|---|---|---|---|---|
| Sample No. | Thickness of first coating part $T_1$ (nm) | Thickness of second coating part $T_2$ (nm) | $T_1 + T_2$ (nm) | $T_2/T_1 + T_2$ (%) | Element β | Content ratio of element β β/P (—) | Insulation resistance after heat resistance test (Ω/mm) | Permeability μi |
| Example B51 | 20.1 | 30.0 | 50.1 | 59.9 | — | 0.00 | $6.79 \times 10^9$ | 24.4 |
| Example B52 | 20.7 | 30.3 | 51.0 | 59.4 | Zn | 0.10 | $5.73 \times 10^9$ | 25.2 |
| Example B53 | 20.0 | 29.9 | 49.9 | 59.9 | Zn | 0.30 | $4.29 \times 10^9$ | 23.9 |
| Example B54 | 21.6 | 29.5 | 51.1 | 57.8 | Zn | 0.50 | $1.14 \times 10^{12}$ | 24.4 |
| Example B55 | 21.4 | 29.8 | 51.2 | 58.2 | Zn | 0.70 | $8.55 \times 10^{11}$ | 24.5 |
| Example B56 | 20.3 | 30.0 | 50.3 | 59.6 | Zn | 0.80 | $3.98 \times 10^{11}$ | 24.0 |
| Example B57 | 20.8 | 30.9 | 51.7 | 59.8 | Zn | 0.90 | $2.58 \times 10^9$ | 24.2 |
| Example B58 | 20.2 | 30.2 | 50.4 | 59.9 | Zn | 0.95 | $1.48 \times 10^9$ | 24.4 |
| Example B59 | 19.8 | 30.3 | 50.1 | 60.5 | Al | 0.50 | $6.31 \times 10^{11}$ | 24.4 |
| Example B60 | 20.2 | 29.6 | 49.8 | 59.4 | Al | 0.70 | $1.58 \times 10^{12}$ | 24.6 |
| Example B61 | 19.1 | 30.4 | 49.5 | 61.4 | Al | 0.80 | $5.01 \times 10^{11}$ | 24.7 |

As shown in Table 5, the addition element α was not included in the first coating part in Example B31. Conversely, Na was included as the addition element α in Examples B32-B38. Based on the comparison of the insulation resistances after the heat resistance test, in each of Examples B33-B36 having a Na content ratio (α/P) within a range of 0.05-0.5, the insulation resistance was high ($10^{11}$ Ω/mm or more) and the degree of improvement of the heat resistance was larger than that of Example B31. On the other hand, in Example B32 having a low Na content ratio and Examples B37 and B38 having a high Na content ratio, the insulation resistances after the test were at about the same level as that of Example B31 which did not contain Na.

These results proved that controlling $T_1$ and $T_2$ within the optimal ranges and including the addition element α at the predetermined content ratio in the first coating part further improved the heat resistance. In Examples B39-B46, the type of the addition element α was changed. It was confirmed that, provided that any addition element α was within the predetermined range of the content ratio, the heat resistance further improved.

Table 6 shows the results of the cases where the addition element β was included in the first coating part. As shown in Table 6, the addition element β was not included in the first coating part in Example B51. Conversely, Zn was included as the addition element β in Examples B52-B58. Based on the comparison of the insulation resistances after the heat resistance test, in each of Examples B54-B56 having a Zn content ratio (β/P) within a range of 0.5-0.8, the insulation resistance was high ($10^{11}$ Ω/mm or more) and the degree of improvement of the heat resistance was larger than that of Example B51. On the other hand, in Examples B52 and B53 having a low Zn content ratio and Examples B57 and B58 having a high Zn content ratio, the insulation resistances were at about the same level as that of Example B51 which did not contain Zn.

These results proved that controlling $T_1$ and $T_2$ within the optimal ranges and including the addition element β at the predetermined content ratio in the first coating part further improved the heat resistance. The addition element β added in Examples B59-B61 was Al instead of Zn. In Examples B59-B61 having an Al content ratio within a range of 0.5-0.8, it was also confirmed that the degree of improvement of the heat resistance after the heat resistance test was larger than that of Example B51.

Experiment C1

In Experiment C1, metal particles having the intermediate layer 16 formed between the first coating part 12 and the second coating part 14 were manufactured. The metal particles were used to prepare the soft magnetic powder samples and the dust core samples according to Examples C1-C18. A manufacturing method used for each Example in Experiment C1 is described below.

Examples C1-C9

Two types of powders, which were the small-size powder and the large-diameter powder, were prepared first as the raw materials of the soft magnetic powder. Specifically, a powder that was made of pure iron and had a median diameter (D50) of 5 μm was prepared as the small-size powder, and a powder that was made of 93.5Fe-6.5Si and had a median diameter (D50) of 25 μm was prepared as the large-diameter powder.

The prepared small-size powder was then coated with the inorganic insulating film in accordance with the following procedure. The phosphate treatment was first applied to the small-size powder to form the first coating part on the surface of each core particle of the small-size powder. The small-size powder was then soaked in the ethanol solution including TEOS, and the solution was stirred. After that, the small-size powder was dried under the predetermined conditions. This further formed the second coating part at the outer side of the first coating part.

In the inorganic insulating film coating process, the concentration of the phosphate solution was adjusted before a heat treatment mentioned later was applied (before the intermediate layer was formed), so that the thickness ($T_1$) of the first coating part was about 18-25 nm. In the sol-gel coating, the concentration of the TEOS solution was adjusted before the heat treatment mentioned later was applied (before the intermediate layer was formed), so that the thickness ($T_2$) of the second coating part was about 25-35 nm.

The small-size powder on which the second coating part was formed was subjected to the heat treatment under predetermined conditions to form the intermediate layer between the first coating part and the second coating part. Specifically, in the heat treatment, the small-size powder was held in a nitrogen atmosphere at a temperature ranging from 500-600° C. for 10-30 minutes. To prepare nine types of the small-size powders each having a different thickness of the intermediate layer, the holding time was changed in the experiment.

The large-diameter powder was subjected only to the sol-gel coating using TEOS to form the silicon-based oxide film on the surface of each core particle of the large-diameter powder.

The soft magnetic powder sample of each of Examples C1-C9 was prepared by mixing the small-size powder and the large-diameter powder thus obtained at a predetermined ratio. The proportion of the small-size powder to the entire soft magnetic powder was common in all Examples in the present experiment, and was 30% by weight.

The soft magnetic powder sample of each of Examples C1-C9 was used to prepare the dust cores having the same dimensions as in Experiment A, under the same manufacturing conditions as in Experiment A. The dust core samples according to Examples C1-C9 were thus obtained.

Examples C11-C18

In Experiment C1, eight types of the small-size powders each having a different total thickness S1 of the inorganic insulating film were prepared while film formation conditions were controlled to have a value of about 0.08 for M1/S1. Adjusting the concentration of the solutions used in the phosphate treatment and the sol-gel coating using TEOS controlled the total thickness S1 of the inorganic insulating film. Except for the above conditions, the experimental conditions were the same as those in Examples C1-C9. Under such conditions, the dust core samples of Examples C11-C18 were prepared.

Comparative Example C1

In Comparative Example C1, only the phosphate compound film was formed on the surface of each core particle of the small-size powder, and the sol-gel coating using TEOS was not performed. Except for the above conditions, the experimental conditions were the same as those in Examples C1-C9. Under such conditions, the soft magnetic powder sample and the dust core samples according to Comparative Example C1 were prepared.

Comparative Example C2

In Comparative Example C2, the phosphate treatment was not applied to the small-size powder, and only the sol-gel coating using TEOS was performed to form only the silicon-based oxide film on the surface of each core particle of the small-size powder. Except for the above conditions, the experimental conditions were the same as those in Examples C1-C9. Under such conditions, the soft magnetic powder sample and the dust core samples according to Comparative Example C2 were prepared.

Evaluation in Experiment C1

In Experiment C1, the analysis of the inorganic insulating film using TEM-EDS, the measurement of the initial permeability, and the heat resistance test were performed, as in that the first coating part whose main component included P and O and the second coating part whose main component included Si and O were formed on the surface of each core particle of the small-size powder in all Examples in Experiment C1. Especially in each of Examples C2-C9 and C11-C18, it was confirmed that the intermediate layer including P and Si was formed between the first coating part and the second coating part. It was also confirmed that only the phosphate compound film was formed on the surface of the core particle of the small-size powder in Comparative Example C1, and only the silicon-based oxide film was formed on the surface of each core particle of the small-size powder in Comparative Example C2. In each Example and each Comparative Example of Experiment C1, it was also confirmed that the silicon-based oxide film having an average thickness of 50 nm was formed on the surface of the large-size powder included in each dust core sample.

In all Examples and Comparative Examples of Experiment C1, the insulation resistance before the heat resistance test was about $1\times10^{14}$ Ω/mm at around the same level. Therefore, in Experiment C1, the dust core having higher insulation resistance after the test is deemed to have better heat resistance, as in Experiment A.

Table 7 shows the evaluation results of Comparative Examples C1-C2 and Examples C1-C9. Table 8 shows the evaluation results of Examples C11-C18.

TABLE 7

| | Composition of inorganic insulating film | | | | | Dust core properties | |
|---|---|---|---|---|---|---|---|
| Sample No. | Thickness of first coating part $T_1$ (nm) | Thickness of second coating part $T_2$ (nm) | Thickness of intermediate layer M1 (nm) | Total thickness S1 (nm) | M1/S1 (—) | Insulation resistance after heat resistance test (Ω/mm) | Permeability μi |
| Comparative Example C1 | 51.3 | 0 | 0 | 51.3 | — | $5.13\times10^{4}$ | 24.8 |
| Comparative Example C2 | 0 | 52.1 | 0 | 52.1 | — | $1.35\times10^{4}$ | 24.9 |
| Example C1 | 19.7 | 30.1 | 0.0 | 49.8 | 0.00 | $1.26\times10^{9}$ | 25.1 |
| Example C2 | 19.2 | 30.9 | 1.3 | 51.4 | 0.03 | $1.32\times10^{10}$ | 24.8 |
| Example C3 | 20.4 | 29.6 | 2.4 | 52.4 | 0.05 | $1.70\times10^{10}$ | 24.9 |
| Example C4 | 20.0 | 28.2 | 3.2 | 51.4 | 0.06 | $3.63\times10^{11}$ | 25.2 |
| Example C5 | 18.1 | 28.2 | 4.0 | 50.3 | 0.08 | $6.61\times10^{11}$ | 25.1 |
| Example C6 | 20.4 | 27.7 | 5.7 | 53.8 | 0.11 | $7.94\times10^{11}$ | 25.2 |
| Example C7 | 19.8 | 26.1 | 7.9 | 53.8 | 0.15 | $2.00\times10^{11}$ | 25.3 |
| Example C8 | 19.4 | 23.7 | 10.2 | 53.3 | 0.19 | $1.62\times10^{11}$ | 24.9 |
| Example C9 | 19.7 | 22.1 | 15.4 | 57.2 | 0.27 | $1.23\times10^{10}$ | 24.8 |

TABLE 8

| | Composition of inorganic insulating film | | | | | Dust core properties | |
|---|---|---|---|---|---|---|---|
| Sample No. | Thickness of first coating part $T_1$ (nm) | Thickness of second coating part $T_2$ (nm) | Thickness of intermediate layer M1 (nm) | Total thickness S1 (nm) | M1/S1 (—) | Insulation resistance after heat resistance test (Ω/mm) | Permeability μi |
| Example C11 | 2.1 | 3.2 | 0.5 | 5.8 | 0.08 | $1.62\times10^{11}$ | 29.2 |
| Example C12 | 4.8 | 7.6 | 1.1 | 13.5 | 0.08 | $2.57\times10^{11}$ | 27.5 |
| Example C13 | 9.9 | 15.3 | 2.2 | 27.4 | 0.08 | $5.62\times10^{11}$ | 26.1 |
| Example C14 | 18.1 | 28.2 | 4.0 | 50.3 | 0.08 | $6.61\times10^{11}$ | 25.1 |
| Example C15 | 38.9 | 60.5 | 8.6 | 108.0 | 0.08 | $8.13\times10^{11}$ | 23.7 |
| Example C16 | 60.2 | 93.8 | 13.3 | 167.3 | 0.08 | $7.76\times10^{11}$ | 22.1 |
| Example C17 | 70.4 | 109.6 | 15.6 | 195.6 | 0.08 | $9.12\times10^{11}$ | 20.6 |
| Example C18 | 74.3 | 115.7 | 16.4 | 206.4 | 0.08 | $9.55\times10^{11}$ | 19.1 |

The insulation resistance after the heat resistance test was reduced to the order of $10^4$ in Comparative Examples C1 and C2 as shown in Table 7. It was thus confirmed that the heat resistance in these Comparative Examples were not sufficient. On the other hand, the insulation resistance after the test in Examples C1-C9 was higher than that in Comparative Examples C1 and C2, despite the total film thickness in Examples C1-C9 being about the same as that in Comparative Examples C1 and C2. It was thus confirmed that forming the first coating part and the second coating part on the surface of the small-size powder improved the heat resistance.

Regarding the thickness of the intermediate layer, it was confirmed that the insulation resistance after the heat resistance test in each of Examples C2-C9 having the intermediate layer was higher than that in Example C1 having no intermediate layer (meaning M1=0.4 nm or less). This result proved that forming the intermediate layer between the first coating part and the second coating part further improved the heat resistance.

Further, in Examples C4-C8, the insulation resistance after the heat resistance test was especially high and was as high as $10^{11}$ Ω/mm or more. In Examples C4-C8, the ratio of the thickness M1 of the intermediate layer to the total thickness S1 of the inorganic insulating film was within a range of $0.05<M1/S1\leq0.2$. From this result, it was confirmed that the ratio of the thickness M1 of the intermediate layer to the total thickness S1 of the inorganic insulating film being within the predetermined range especially improved the heat resistance. In Experiment C1, the heat resistance was the highest and was $5\times10^{11}$ Ω/mm or more in Examples C5 and C6 in which the thickness of the intermediate layer satisfied $0.07\leq M1/S1\leq0.12$.

As shown in Table 8, it was confirmed that thickening the total thickness S1 of the inorganic insulating film tended to increase the insulation resistance after the heat resistance test. Conversely, the initial permeability μi tended to decrease in accordance with the increase of the film thickness. Especially in Example C18 having a total thickness S1 of the inorganic insulating film of 200 nm or more, the initial permeability μi was reduced to 20 or less.

In Examples C11-C17 having the intermediate layer and a thickness S1 of 200 nm or less, the insulation resistance after the test was as high as $10^{11}$ Ω/mm or more, and the initial permeability μi was 20 or more. These Examples had both sufficient insulating properties and sufficient magnetic properties. This result proved that controlling the thickness of the intermediate layer within the predetermined range of the ratio enabled the insulation resistance after the heat resistance test to stay high and allowed for high permeability at the same time, even when the total thickness of the inorganic insulating film was thin.

Experiment C2

In Experiment C2, the thickness of each layer or film ($T_1$, $T_2$, M1, and S1) was controlled within the optimal range, and the addition element α or β was added to the first coating part, during the formation of the inorganic insulating film. Under such conditions, the soft magnetic powder samples and the dust core samples according to Examples C21-C51 were prepared.

Examples C21-C36 and C41-C51

In Examples C21-C51, using the phosphate solution including the addition element α or β in the phosphate treatment to form the first coating part, the small-size powder was obtained. Specifically, the first coating part of the small-size powder in Examples C21-C36 included the addition element α selected from the alkali metals or the alkaline earth metals. Table 9 shows the addition element α in each of Examples C21-C36 and its content ratio (α/P). Similarly, the first coating part of the small-size powder in Examples C41-C51 included the addition element β selected from Zn or Al. Table 10 shows the addition element β in each of Examples C41-C51 and its content ratio (β/P).

In all Examples of Experiment C2, film formation conditions were controlled so that the thickness $T_1$ of the first coating part was 18±1 nm, the thickness $T_2$ of the second coating part was 28±1 nm, and the thickness M1 of the intermediate layer was 4.0±0.5 nm. That means the total thickness S1 of the inorganic insulating film was 50±2 nm and M1/S1 was about 0.08 in all Examples of Experiment C2. Except for the above conditions, the experimental conditions were the same as those in Experiment C1. Under such conditions, the soft magnetic powder samples and the dust core samples of Examples C21-C36 and C41-C51 were prepared. Their performance was evaluated as in Experiment C1. Tables 9 and 10 show the evaluation results of each Example.

TABLE 9

| | Composition of inorganic insulating film | | | | | | | Dust core properties | |
|---|---|---|---|---|---|---|---|---|---|
| Sample No. | Thickness of first coating part $T_1$ (nm) | Thickness of second coating part $T_2$ (nm) | Thickness of intermediate layer M1 (nm) | Total thickness S1 (nm) | M1/S1 (—) | Element α included in first coating part | Content ratio of element α α/P | Insulation resistance after heat resistance test (Ω/mm) | Permeability μi |
| Example C21 | 18.1 | 28.2 | 4.0 | 50.3 | 0.08 | — | — | $6.61\times10^{11}$ | 25.1 |
| Example C22 | 17.9 | 28.3 | 3.9 | 50.1 | 0.08 | Na | 0.03 | $8.13\times10^{11}$ | 25.9 |
| Example C23 | 17.7 | 27.9 | 4.1 | 49.7 | 0.08 | Na | 0.05 | $1.26\times10^{13}$ | 24.6 |
| Example C24 | 18.5 | 28.4 | 4.1 | 51.0 | 0.08 | Na | 0.10 | $3.16\times10^{13}$ | 25.1 |
| Example C25 | 18.2 | 27.8 | 3.8 | 49.8 | 0.08 | Na | 0.30 | $2.43\times10^{13}$ | 25.2 |
| Example C26 | 17.9 | 28.2 | 4.2 | 50.3 | 0.08 | Na | 0.50 | $1.26\times10^{13}$ | 24.7 |
| Example C27 | 18.1 | 27.7 | 3.8 | 49.6 | 0.08 | Na | 0.60 | $5.13\times10^{11}$ | 24.9 |
| Example C28 | 18.4 | 27.7 | 4.1 | 50.2 | 0.08 | Na | 0.70 | $3.24\times10^{11}$ | 25.1 |
| Example C29 | 17.9 | 27.6 | 3.8 | 49.3 | 0.08 | Li | 0.10 | $1.26\times10^{13}$ | 25.1 |
| Example C30 | 17.9 | 28.2 | 3.9 | 50.0 | 0.08 | K | 0.10 | $1.58\times10^{13}$ | 25.2 |
| Example C31 | 18.2 | 27.5 | 3.8 | 49.5 | 0.08 | Rb | 0.10 | $2.51\times10^{13}$ | 25.1 |
| Example C32 | 18.5 | 27.8 | 3.8 | 50.1 | 0.08 | Cs | 0.10 | $1.58\times10^{13}$ | 24.9 |

TABLE 9-continued

| | Composition of inorganic insulating film | | | | | | | Dust core properties | |
|---|---|---|---|---|---|---|---|---|---|
| Sample No. | Thickness of first coating part $T_1$ (nm) | Thickness of second coating part $T_2$ (nm) | Thickness of intermediate layer M1 (nm) | Total thickness S1 (nm) | M1/S1 (—) | Element α included in first coating part | Content ratio of element α α/P | Insulation resistance after heat resistance test (Ω/mm) | Permeability μi |
| Example C33 | 17.8 | 27.7 | 3.8 | 49.3 | 0.08 | Mg | 0.10 | $1.26 \times 10^{13}$ | 25.1 |
| Example C34 | 17.7 | 28.1 | 3.8 | 49.6 | 0.08 | Ca | 0.10 | $2.51 \times 10^{13}$ | 25.1 |
| Example C35 | 17.9 | 28.0 | 3.8 | 49.7 | 0.08 | Sr | 0.10 | $1.58 \times 10^{13}$ | 24.8 |
| Example C36 | 18.2 | 27.7 | 3.8 | 49.7 | 0.08 | Ba | 0.10 | $1.26 \times 10^{13}$ | 25.1 |

TABLE 10

| | Composition of inorganic insulating film | | | | | | | Dust core properties | |
|---|---|---|---|---|---|---|---|---|---|
| Sample No. | Thickness of first coating part $T_1$ (nm) | Thickness of second coating part $T_2$ (nm) | Thickness of intermediate layer M1 (nm) | Total thickness S1 (nm) | M1/S1 (—) | Element β included in first coating part | Content ratio of element β β/P | Insulation resistance after heat resistance test (Ω/mm) | Permeability μi |
| Example C41 | 18.1 | 28.2 | 4.0 | 50.3 | 0.08 | — | — | $6.61 \times 10^{11}$ | 25.1 |
| Example C42 | 17.9 | 28.3 | 3.9 | 50.1 | 0.08 | Zn | 0.10 | $8.14 \times 10^{11}$ | 25.9 |
| Example C43 | 17.7 | 27.9 | 4.1 | 49.7 | 0.08 | Zn | 0.30 | $7.76 \times 10^{11}$ | 24.7 |
| Example C44 | 18.5 | 28.4 | 4.1 | 51.0 | 0.08 | Zn | 0.50 | $2.75 \times 10^{13}$ | 25.2 |
| Example C45 | 18.2 | 27.8 | 3.8 | 49.8 | 0.08 | Zn | 0.70 | $3.24 \times 10^{13}$ | 24.6 |
| Example C46 | 17.9 | 28.2 | 4.2 | 50.3 | 0.08 | Zn | 0.80 | $1.29 \times 10^{13}$ | 25.1 |
| Example C47 | 18.1 | 27.7 | 3.8 | 49.6 | 0.08 | Zn | 0.90 | $3.47 \times 10^{11}$ | 25.1 |
| Example C48 | 18.4 | 27.7 | 4.3 | 50.4 | 0.09 | Zn | 0.95 | $1.70 \times 10^{11}$ | 24.9 |
| Example C49 | 17.7 | 28.3 | 4.2 | 50.2 | 0.08 | Al | 0.50 | $1.32 \times 10^{13}$ | 24.8 |
| Example C50 | 18.2 | 27.7 | 3.8 | 49.7 | 0.08 | Al | 0.70 | $1.66 \times 10^{13}$ | 24.9 |
| Example C51 | 18.1 | 27.9 | 4.0 | 50.0 | 0.08 | Al | 0.80 | $1.66 \times 10^{13}$ | 25.1 |

As shown in Table 9, the addition element α was not included in the first coating part in Example C21. Conversely, Na was included as the addition element α in Examples C22-C28. Based on the comparison of the insulation resistances after the heat resistance test, in each of Examples C23-C26 having a Na content ratio (α/P) within a range of 0.05-0.5, the insulation resistance was high ($10^{13}$ Ω/mm or more) and the degree of improvement of the heat resistance was larger than that of Example C21. On the other hand, in Example C22 having a low Na content ratio and Examples C27 and C28 having a high Na content ratio, the insulation resistances were at about the same level as that of Example C21 which did not contain Na.

These results proved that forming the intermediate layer and including the addition element α at the predetermined content ratio in the first coating part further improved the heat resistance. In Examples C29-C36, the type of the addition element α was changed. It was confirmed that, provided that any addition element α was within the predetermined range of the content ratio, the heat resistance further improved.

Table 10 shows the results of the cases where the addition element β was included in the first coating part. As shown in Table 10, the addition element β was not included in the first coating part in Example C41. Conversely, Zn was included as the addition element β in Examples C42-C48. Based on the comparison of the insulation resistances after the heat resistance test, in each of Examples C44-C46 having a Zn content ratio (β/P) within a range of 0.5-0.8, the insulation resistance was high ($10^{13}$ Ω/mm or more) and the degree of improvement of the heat resistance was larger than that of Example C41. On the other hand, in Examples C42 and C43 having a low Zn content ratio and Examples C47 and C48 having a high Zn content ratio, the insulation resistances were at about the same level as that of Example C41 which did not contain Zn.

These results proved that forming the intermediate layer and including the addition element β at the predetermined content ratio in the first coating part further improved the heat resistance. The addition element β added in Examples C49-C51 was Al instead of Zn. In Examples C49-C51, having an Al content ratio within a range of 0.5-0.8, it was also confirmed that the degree of improvement of the heat resistance after the heat resistance test was larger than that of Example C41.

For the convenience of the evaluation, the dust core samples were used for the heat resistance test and the measurement of permeability in above Experiments A-C. However, the similar evaluation performed for the dust cores was also performed for the soft magnetic powders. It was confirmed that the similar tendency regarding the heat resistance and the magnetic properties observed for the dust cores was also observed in the evaluation for the soft magnetic powders.

While the ratio of the large-size powder to the small-size powder was the same in all samples in above Examples, an experiment in which the proportion of the small-size powder was changed to 5%-40% was also performed. In the experiment in which the proportion of the small-size powder was changed, it was confirmed that the similar tendency regarding the heat resistance and the magnetic properties observed in above Examples was observed. It was thus confirmed that the effects of the present disclosure could be achieved as long as the soft magnetic powder (the coated particles 2 shown in FIG. 2) according to the present disclosure was included in the dust core, even if the proportion of the small-size powder was changed.

DESCRIPTION OF REFERENCE NUMERALS

1,8 . . . soft magnetic powder
1*a* . . . small-size powder
2 . . . coated particle
4 . . . soft magnetic metal particle
6 . . . large-size powder
10 . . . inorganic insulating film
12 . . . first coating part
14 . . . second coating part
16 . . . intermediate layer
20 . . . resin
100 . . . inductor element
110, 111 . . . dust core
120 . . . coil

What is claimed is:

1. A soft magnetic powder comprising a soft magnetic metal particle whose surface is coated with an inorganic insulating film, wherein the inorganic insulating film comprises a first coating part in contact with the surface of the soft magnetic metal particle, and a second coating part formed at an outer side of the first coating part, and wherein, the first coating part includes phosphorus and oxygen, the second coating part includes silicon and oxygen, an intermediate layer including phosphorus and silicon is formed between the first coating part and the second coating part in the inorganic insulating film, a total thickness (S1) of the inorganic insulating film is 200 nm or less; and a ratio of a thickness (M1) of the intermediate layer to the total thickness (S1) of the inorganic insulating film satisfies $0.05<M1/S1\le 0.2$.

2. The soft magnetic powder according to claim 1, wherein a sum of a thickness ($T_1$) of the first coating part and a thickness ($T_2$) of the second coating part satisfies 10 nm$\le T_1+T_{2\le 150}$ nm; and a ratio of the thickness ($T_2$) of the second coating part to the sum ($T_1+T_2$) of the thickness of the first coating part and the thickness of the second coating part satisfies $20\%\le T_2/(T_1+T_2)\le 90\%$.

3. The soft magnetic powder according to claim 2, wherein the ratio of the thickness ($T_2$) of the second coating part to the sum ($T_1+T_2$) of the thickness of the first coating part and the thickness of the second coating part satisfies $50\%\le T_2/(T_1+T_2)\le 80\%$.

4. A magnetic core including the soft magnetic powder according to claim 1.

5. An electronic component comprising the magnetic core according to claim 1.

6. A soft magnetic powder comprising a soft magnetic metal particle whose surface is coated with an inorganic insulating film, wherein the inorganic insulating film comprises a first coating part in contact with the surface of the soft magnetic metal particle, and a second coating part formed at an outer side of the first coating part, and wherein, the first coating part includes phosphorus and oxygen, the second coating part includes silicon and oxygen, an intermediate layer including phosphorus and silicon is formed between the first coating part and the second coating part in the inorganic insulating film, the first coating part includes at least one element (a) selected from the group consisting of Li, Na, K, Rb, Cs, Mg, Ca, Sr, and Ba; and a content ratio ($\alpha$/P) by mole of the at least one element $\alpha$ to phosphorus (P) in the first coating part satisfies $0.05\le\alpha/P\le 0.5$.

7. The soft magnetic powder according to claim 6, wherein the at least one element $\alpha$ included in the first coating part is Na.

8. The soft magnetic powder according to claim 6, wherein a sum of a thickness ($T_1$) of the first coating part and a thickness ($T_2$) of the second coating part satisfies 10 nm$\le T_1+T_{2\le 150}$ nm; and a ratio of the thickness ($T_2$) of the second coating part to the sum ($T_1+T_2$) of the thickness of the first coating part and the thickness of the second coating part satisfies $20\%\le T_2/(T_1+T_2)\le 90\%$.

9. The soft magnetic powder according to claim 8, wherein the ratio of the thickness ($T_2$) of the second coating part to the sum ($T_1+T_2$) of the thickness of the first coating part and the thickness of the second coating part satisfies $50\%\le T_2/(T_1+T_2)\le 80\%$.

10. A magnetic core including the soft magnetic powder according to claim 6.

11. An electronic component comprising the magnetic core according to claim 10.

12. A soft magnetic powder comprising a soft magnetic metal particle whose surface is coated with an inorganic insulating film, wherein the inorganic insulating film comprises a first coating part in contact with the surface of the soft magnetic metal particle, and a second coating part formed at an outer side of the first coating part, and wherein, the first coating part includes phosphorus and oxygen, and the second coating part includes silicon and oxygen, the first coating part includes at least one element ($\beta$) selected from the group consisting of Zn and Al; and a content ratio (B/P) by mole of the at least one element $\beta$ to phosphorus (P) in the first coating part satisfies $0.5\le B/P\le 0.8$.

13. The soft magnetic powder according to claim 12, wherein the at least one element $\beta$ included in the first coating part is Zn.

14. The soft magnetic powder according to claim 12, wherein a sum of a thickness ($T_1$) of the first coating part and a thickness ($T_2$) of the second coating part satisfies 10 nm$\le T_1+T_{2\le 150}$ nm; and a ratio of the thickness ($T_2$) of the second coating part to the sum ($T_1+T_2$) of the thickness of the first coating part and the thickness of the second coating part satisfies $20\%\le T_2/(T_1+T_2)\le 90\%$.

15. The soft magnetic powder according to claim 14, wherein the ratio of the thickness ($T_2$) of the second coating part to the sum ($T_1+T_2$) of the thickness of the first coating part and the thickness of the second coating part satisfies $50\%\le T_2/(T_1+T_2)\le 80\%$.

16. The soft magnetic powder according to claim 14, wherein an intermediate layer including phosphorus and silicon is formed between the first coating part and the second coating part in the inorganic insulating film.

17. A magnetic core including the soft magnetic powder according to claim 12.

18. An electronic component comprising the magnetic core according to claim 17.

* * * * *